US010597797B2

(12) United States Patent
Topolkaraev et al.

(10) Patent No.: US 10,597,797 B2
(45) Date of Patent: Mar. 24, 2020

(54) MODIFIED POLYLACTIC ACID FIBERS

(71) Applicant: Kimberly-Clark Worldwide, Inc., Neenah, WI (US)

(72) Inventors: Vasily A. Topolkaraev, Appleton, WI (US); Ryan J. McEneany, Appleton, WI (US); Thomas A. Eby, Greenville, WI (US); Tyler J. Lark, Madison, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 434 days.

(21) Appl. No.: 14/521,511

(22) Filed: Oct. 23, 2014

(65) Prior Publication Data

US 2015/0044929 A1 Feb. 12, 2015

Related U.S. Application Data

(62) Division of application No. 12/856,012, filed on Aug. 13, 2010, now Pat. No. 8,936,740.

(51) Int. Cl.
*D01F 6/62* (2006.01)
*B29C 48/16* (2019.01)
(Continued)

(52) U.S. Cl.
CPC ............... *D01F 6/625* (2013.01); *B29C 48/16* (2019.02); *C08G 63/08* (2013.01); *C08L 67/04* (2013.01);
(Continued)

(58) Field of Classification Search
CPC . D01F 6/625; D01F 6/62; C08G 63/08; Y10T 428/298; Y10T 442/615; Y10T 442/608
(Continued)

(56) References Cited

U.S. PATENT DOCUMENTS 3,338,992 A 8/1967 Kinney
3,341,394 A 9/1967 Kinney
(Continued)

FOREIGN PATENT DOCUMENTS

EP 1054085 A1 11/2000
EP 1361039 A1 11/2003
(Continued)

OTHER PUBLICATIONS

Machine translation for JP H05-179110. (Year: 1993).*
(Continued)

*Primary Examiner* — Peter Y Choi
(74) *Attorney, Agent, or Firm* — Dority & Manning, P.A.

(57) ABSTRACT

A method for forming biodegradable fibers is provided. The method includes blending polylactic acid with a polyepoxide modifier to form a thermoplastic composition, extruding the thermoplastic composition through a die, and thereafter passing the extruded composition through a die to form a fiber. Without intending to be limited by theory, it is believed that the polyepoxide modifier reacts with the polylactic acid and results in branching of its polymer backbone, thereby improving its melt strength and stability during fiber spinning without significantly reducing glass transition temperature. The reaction-induced branching can also increase molecular weight, which may lead to improved fiber ductility and the ability to better dissipate energy when subjected to an elongation force. Through selective control over this method, the present inventors have discovered that the resulting fibers may exhibit good mechanical properties, both during and after melt spinning.

11 Claims, 5 Drawing Sheets

(51) Int. Cl.
| | |
|---|---|
| *D01D 5/38* | (2006.01) |
| *D01F 1/02* | (2006.01) |
| *D04H 3/011* | (2012.01) |
| *D04H 3/16* | (2006.01) |
| *C08L 67/04* | (2006.01) |
| *D01F 6/92* | (2006.01) |
| *C08G 63/08* | (2006.01) |
| *B29K 63/00* | (2006.01) |
| *B29K 67/00* | (2006.01) |
| *B29K 105/00* | (2006.01) |

(52) U.S. Cl.
CPC ............... *D01D 5/38* (2013.01); *D01F 1/02* (2013.01); *D01F 6/92* (2013.01); *D04H 3/011* (2013.01); *D04H 3/16* (2013.01); *B29K 2063/00* (2013.01); *B29K 2067/046* (2013.01); *B29K 2105/0005* (2013.01); *B29K 2995/006* (2013.01); *B29K 2995/0088* (2013.01); *C08L 2203/12* (2013.01); *Y10T 428/298* (2015.01); *Y10T 442/608* (2015.04); *Y10T 442/615* (2015.04)

(58) Field of Classification Search
USPC .................................................. 442/341
See application file for complete search history.

(56) References Cited

U.S. PATENT DOCUMENTS

| | | |
|---|---|---|
| 3,423,255 A | 1/1969 | Joyce |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,802,817 A | 4/1974 | Matsuki et al. |
| 3,849,241 A | 11/1974 | Butin et al. |
| 3,855,046 A | 12/1974 | Hansen et al. |
| 4,041,203 A | 8/1977 | Brock et al. |
| 4,055,702 A | 10/1977 | Guthrie et al. |
| 4,100,324 A | 7/1978 | Anderson et al. |
| 4,215,682 A | 8/1980 | Kubik et al. |
| 4,307,143 A | 12/1981 | Meitner |
| 4,340,563 A | 7/1982 | Appel et al. |
| 4,374,888 A | 2/1983 | Bornslaeger |
| 4,375,718 A | 3/1983 | Wadsworth et al. |
| 4,592,815 A | 6/1986 | Nakao |
| 4,707,398 A | 11/1987 | Boggs |
| 4,766,029 A | 8/1988 | Brock et al. |
| 4,789,592 A | 12/1988 | Taniguchi et al. |
| 4,795,668 A | 1/1989 | Krueger et al. |
| 4,797,468 A | 1/1989 | De Vries |
| 4,874,659 A | 10/1989 | Ando et al. |
| 4,937,299 A | 6/1990 | Ewen et al. |
| D315,990 S | 4/1991 | Blenke et al. |
| 5,057,368 A | 10/1991 | Largman et al. |
| 5,069,970 A | 12/1991 | Largman et al. |
| 5,108,820 A | 4/1992 | Kaneko et al. |
| 5,162,074 A | 11/1992 | Hills |
| 5,169,706 A | 12/1992 | Collier, IV et al. |
| 5,179,164 A | 1/1993 | Lausberg et al. |
| 5,213,881 A | 5/1993 | Timmons et al. |
| 5,218,071 A | 6/1993 | Tsutsui et al. |
| 5,266,610 A | 11/1993 | Malhotra et al. |
| 5,272,236 A | 12/1993 | Lai et al. |
| 5,277,976 A | 1/1994 | Hogle et al. |
| 5,278,272 A | 1/1994 | Lai et al. |
| 5,279,976 A | 1/1994 | Hayden et al. |
| 5,284,703 A | 2/1994 | Everhart et al. |
| 5,317,059 A | 5/1994 | Chundury et al. |
| 5,322,728 A | 6/1994 | Davey et al. |
| 5,336,552 A | 8/1994 | Strack et al. |
| 5,350,624 A | 9/1994 | Georger et al. |
| 5,382,400 A | 1/1995 | Pike et al. |
| 5,401,446 A | 3/1995 | Tsai et al. |
| D358,035 S | 5/1995 | Zander et al. |
| 5,422,377 A | 6/1995 | Aubert |
| 5,464,688 A | 11/1995 | Timmons et al. |
| 5,466,410 A | 11/1995 | Hills |
| 5,470,944 A | 11/1995 | Bonsignore |
| 5,472,775 A | 12/1995 | Obijeski et al. |
| 5,502,158 A | 3/1996 | Sinclair et al. |
| 5,539,056 A | 7/1996 | Yang et al. |
| 5,571,619 A | 11/1996 | McAlpin et al. |
| 5,596,052 A | 1/1997 | Resconi et al. |
| 5,620,779 A | 4/1997 | Levy et al. |
| D384,508 S | 10/1997 | Zander et al. |
| D384,819 S | 10/1997 | Zander et al. |
| 5,686,531 A | 11/1997 | Engelke et al. |
| D390,708 S | 2/1998 | Brown |
| 5,714,573 A | 2/1998 | Randall et al. |
| 5,770,682 A | 6/1998 | Ohara et al. |
| 5,807,490 A | 9/1998 | Davis et al. |
| 5,821,327 A | 10/1998 | Oota et al. |
| 5,880,254 A | 3/1999 | Ohara et al. |
| 5,883,026 A | 3/1999 | Reader et al. |
| 5,883,199 A | 3/1999 | McCarthy et al. |
| 5,908,598 A | 6/1999 | Rousseau et al. |
| 5,962,112 A | 10/1999 | Haynes et al. |
| D418,305 S | 1/2000 | Zander et al. |
| D428,267 S | 7/2000 | Romano, III et al. |
| 6,090,325 A | 7/2000 | Wheat et al. |
| 6,093,665 A | 7/2000 | Sayovitz et al. |
| 6,117,928 A | 9/2000 | Hiltunen et al. |
| 6,153,138 A | 11/2000 | Helms, Jr. et al. |
| 6,200,669 B1 | 3/2001 | Marmon et al. |
| 6,235,825 B1 | 5/2001 | Yoshida et al. |
| 6,291,597 B1 | 9/2001 | Gruber et al. |
| 6,309,988 B1 | 10/2001 | Tsai et al. |
| 6,326,458 B1 | 12/2001 | Gruber et al. |
| 6,365,088 B1 | 4/2002 | Knight et al. |
| 6,372,846 B1 | 4/2002 | McGrail et al. |
| 6,500,563 B1 | 12/2002 | Datta et al. |
| 6,660,211 B2 | 12/2003 | Topolkaraev et al. |
| 6,713,175 B1 | 3/2004 | Terada et al. |
| 6,756,331 B2 | 6/2004 | Kasemura et al. |
| 6,811,874 B2 | 11/2004 | Tanaka et al. |
| 6,815,475 B2 | 11/2004 | Donald et al. |
| 6,838,403 B2 | 1/2005 | Tsai et al. |
| 6,949,288 B2 | 9/2005 | Hodge et al. |
| 7,135,523 B2 | 11/2006 | Ho et al. |
| 7,256,223 B2 | 8/2007 | Mohanty et al. |
| 7,354,973 B2 | 4/2008 | Flexman |
| 7,368,503 B2 | 5/2008 | Hale |
| 7,393,590 B2 | 7/2008 | Scheer et al. |
| 7,566,753 B2 | 7/2009 | Randall et al. |
| 7,632,544 B2 | 12/2009 | Ho et al. |
| 7,863,382 B2 | 1/2011 | Ishii et al. |
| 7,872,056 B2 | 1/2011 | Cheung et al. |
| 7,977,397 B2 | 7/2011 | Cheung et al. |
| 7,994,078 B2 | 8/2011 | Reichmann et al. |
| 8,022,139 B2 | 9/2011 | Kurihara et al. |
| 8,026,309 B2 | 9/2011 | Halahmi et al. |
| 8,030,382 B2 | 10/2011 | Endo et al. |
| 8,044,134 B2 | 10/2011 | Chung et al. |
| 8,075,994 B2 | 12/2011 | Sakamoto et al. |
| 8,076,406 B2 | 12/2011 | Brule et al. |
| 8,188,188 B2 | 5/2012 | Kobayashi et al. |
| 8,236,893 B2 | 8/2012 | Nakagawa et al. |
| 8,268,738 B2 | 9/2012 | McEneany et al. |
| 8,268,913 B2 | 9/2012 | Li et al. |
| 8,287,677 B2 | 10/2012 | Lake et al. |
| 8,334,327 B2 | 12/2012 | Kaufman et al. |
| 8,362,145 B2 | 1/2013 | Li et al. |
| 8,372,917 B2 | 2/2013 | Li et al. |
| 8,410,215 B2 | 4/2013 | Sano et al. |
| 8,415,008 B2 | 4/2013 | Ito et al. |
| 8,444,905 B2 | 5/2013 | Li et al. |
| 2003/0039775 A1 | 2/2003 | Kong |
| 2003/0105231 A1 | 6/2003 | Miller |
| 2003/0153684 A1 | 8/2003 | Miller |
| 2004/0002273 A1 | 1/2004 | Fitting et al. |
| 2004/0077792 A1 | 4/2004 | Qiao et al. |

(56) References Cited

U.S. PATENT DOCUMENTS

| | | |
|---|---|---|
| 2005/0112363 A1 | 5/2005 | Ning |
| 2006/0263394 A1 | 11/2006 | Oyama et al. |
| 2007/0155906 A1 | 7/2007 | Hissink et al. |
| 2007/0182041 A1 | 8/2007 | Rizk et al. |
| 2008/0042312 A1 | 2/2008 | Chen et al. |
| 2008/0147165 A1 | 6/2008 | Hossainy et al. |
| 2008/0150185 A1* | 6/2008 | Topolkaraev .......... D04H 3/11 264/109 |
| 2008/0287024 A1 | 11/2008 | Chakravarty et al. |
| 2008/0287026 A1 | 11/2008 | Chakravarty et al. |
| 2008/0311814 A1 | 12/2008 | O'Sickey et al. |
| 2009/0030132 A1 | 1/2009 | Kumazawa et al. |
| 2009/0060860 A1 | 3/2009 | Almenar et al. |
| 2009/0068463 A1 | 3/2009 | Mochizuki et al. |
| 2009/0069463 A1 | 3/2009 | Serizawa et al. |
| 2009/0124723 A1 | 5/2009 | Hogt et al. |
| 2009/0124956 A1 | 5/2009 | Swetlin et al. |
| 2009/0236309 A1 | 9/2009 | Millward et al. |
| 2009/0239086 A1 | 9/2009 | Ishizuka et al. |
| 2009/0246155 A1 | 10/2009 | Bitler et al. |
| 2009/0274871 A1 | 11/2009 | Takahashi et al. |
| 2009/0311937 A1 | 12/2009 | He et al. |
| 2009/0324911 A1 | 12/2009 | Li et al. |
| 2009/0326152 A1 | 12/2009 | Li et al. |
| 2010/0003882 A1 | 1/2010 | Sumi et al. |
| 2010/0028657 A1 | 2/2010 | Ito et al. |
| 2010/0048082 A1 | 2/2010 | Topolkaraev et al. |
| 2010/0056656 A1 | 3/2010 | Matsuoka et al. |
| 2010/0112357 A1 | 5/2010 | Fine et al. |
| 2010/0113677 A1 | 5/2010 | Brule et al. |
| 2011/0028062 A1 | 2/2011 | Chester et al. |
| 2011/0046281 A1 | 2/2011 | Scheer et al. |
| 2011/0065573 A1 | 3/2011 | McEneany et al. |
| 2011/0178196 A1 | 7/2011 | Steinke et al. |
| 2011/0190447 A1 | 8/2011 | Li et al. |
| 2011/0195210 A1 | 8/2011 | Li et al. |
| 2011/0245420 A1 | 10/2011 | Rasal et al. |
| 2011/0251346 A1 | 10/2011 | Li et al. |
| 2011/0262683 A1 | 10/2011 | Mochizuki et al. |
| 2012/0040185 A1 | 2/2012 | Topolkaraev et al. |

FOREIGN PATENT DOCUMENTS

| | | | | |
|---|---|---|---|---|
| EP | 1725614 B1 | | 8/2008 | |
| GB | 1385105 | | 2/1975 | |
| JP | H05-179110 | * | 7/1993 | |
| KR | 20080072740 A | | 8/2008 | |
| KR | 20090024709 A | | 3/2009 | |
| KR | 20090034199 A | | 4/2009 | |
| WO | WO 0134886 A1 | | 5/2001 | |
| WO | WO 03066704 A1 | | 8/2003 | |
| WO | WO 2007092417 A1 | | 8/2007 | |
| WO | WO 2007115081 A2 | | 10/2007 | |
| WO | WO 2007115081 A3 | | 10/2007 | |
| WO | WO 2008008074 A1 | * | 1/2008 | ............... B32B 5/26 |
| WO | WO 2008015232 A1 | | 2/2008 | |
| WO | WO 2008020726 A1 | | 2/2008 | |
| WO | WO 2008030599 A2 | | 3/2008 | |
| WO | WO 2008030599 A3 | | 3/2008 | |
| WO | WO 2008073101 A1 | | 6/2008 | |
| WO | WO 2008078413 A1 | | 7/2008 | |
| WO | WO 2008078802 A1 | | 7/2008 | |
| WO | WO 2008079784 A2 | | 7/2008 | |
| WO | WO 2008079784 A3 | | 7/2008 | |
| WO | WO 2009145778 A1 | | 12/2009 | |
| WO | WO 2009151437 A1 | | 12/2009 | |
| WO | WO 2009151439 A1 | | 12/2009 | |
| WO | WO 2010002669 A1 | | 1/2010 | |
| WO | WO 2010034689 A1 | | 4/2010 | |
| WO | WO 2011080623 A2 | | 7/2011 | |
| WO | WO 2011080623 A3 | | 7/2011 | |

OTHER PUBLICATIONS

ASTM D 1238-04—Standard Test Method for Melt Flow Rates of Thermoplastics by Extrusion Plastometer, Current edition approved Dec. 1, 2004, pp. 1-14.

ASTM D 1239-92—Standard Test Method for Resistance of Plastic Films to Extraction by Chemicals, Current edition approved Aug. 15, 1992, pp. 281-282.

ASTM D 3418-03 (Formerly D 3417-99)—Standard Test Method for Enthalpies of Fusion and Crystallization of Polymers by Differential Scanning Calorimetry (DSC), Current edition approved Dec. 1, 2003, pp. 65-72.

ASTM D 5338-92—Standard Test Method for Determining Aerobic Biodegradation of Plastic Materials Under Controlled Composting Conditions, Current edition approved Dec. 15, 1992, pp. 456-461.

ASTM D 7191-05—Standard Test Method for Determination of Moisture in Plastics by Relative Humidity Sensor, Current edition approved Nov. 1, 2005, pp. 1-4.

Machine Translation of JP2005-088600, dated Apr. 7, 2005.
Machine Translation of JP2007-270076, dated Oct. 18, 2007.
Machine Translation of JP2009-197099, dated Sep. 3, 2009.
Machine Translation of JP2010-001369, dated Jan. 7, 2010.
Machine Translation of JP2010-046852, dated Mar. 4, 2010.
Machine Translation of JPH09059408, dated Mar. 4, 1997.

Abstract of Article—Balakrishnan et al., "Mechanical, Thermal, and Morphological Properties of Polylactic Acid/Linear Low Density Polyethylene Blends," *Journal of Elastomers and Plastics*, vol. 42, No. 3, May 2010, pp. 223-239.

Abstract of Article—Su Si-Ling et al., "Toughening PLA with E-MA-GMA," *Polymer Materials Science & Engineering*, vol. 24, No. 4, pp. 53-57.

Article—Gramlich et al., "Reactive Compatibilization of Poly(L-lactide) and Conjugated Soybean Oil," *Macromolecules*, vol. 43, No. 5, 2010, pp. 2313-2321.

Article—Jing et al., "A Bifunctional Monomer Derived from Lactide for Toughening Polylactide," *J. Am. Chem. Soc.*, vol. 130, No. 42, 2008, pp. 13826-13867.

Article—Robertson et al., "Toughening of Polylactide with Polymerized Soybean Oil," *Macromolecules*, vol. 43, 2010, pp. 1807-1814.

Balakrishnan et al., "Novel toughened polylactic acid nanocomposite. Mechanical, thermal and morphological properties," *Materials and Design*, vol. 31, 2010, pp. 3289-3298.

Chalamet et al., "Carboxyl Terminated Polyamide 12 Chain Extension by Reactive Extrusion Using a Dioxazoline Coupling Agent. Part I: Extrusion Parameters Analysis," *Polymer Engineering and Science*, vol. 40, No. 1, Jan. 2000, pp. 263-274.

Chalamet et al., "Carboxyl Terminated Polyamide 12 Chain Extension by Reactive Extrusion Using a Dioxazoline Coupling Agent. Part II: Effects of Extrusion Conditions," *Polymer Engineering and Science*, vol. 42, No. 12, Dec. 2002, pp. 2317-2327.

Japon et al., "Reactive processing of poly(ethylene terephthalate) modified with multifunctional epoxy-based additives," *Polymer*, vol. 41, 2000, pp. 5809-5818.

Oyama, Hideko T., "Super-tough poly(lactic acid) materials: Reactive blending with ethylene copolymer," *Polymer*, vol. 50, 2009, pp. 747-751.

Part of Book—Biopolymers, vol. 4, Polyester III, Applications and Commercial Products, Edited by Y. Doi and A. Steinbüchel—Polyactides by Prof. Dr. Hideto Tsuji, 2002, pp. 129-177.

Part of Book—Handbook of Plasticizers, 2nd Edition, 2004, 2012—Theories of Compatability by Yu et al.

Product Information—Lotader® Applications—Impact modifier for engineer plastics, Jan. 3, 2012, 1 page.

Product Information on Lotader® AX8950 from Arkema, Jul. 2004, 2 pages.

Search Report and Written Opinion for PCT/IB2011/053009 dated Mar. 28, 2012, 10 pages.

(56) References Cited

OTHER PUBLICATIONS

Senichev et al., "Theories of Compatibility," Chapter 6, *Handbook of Plasticizers*, edited by George Wypych, ChemTec Publishing, 2004, pp. 121-150.

Sun et al., "Toughening of poly(butylene terephthalate) with epoxy-functionalized acrylonitrile-butadiene-styrene," *Polymer*, vol. 46, 2005, pp. 7632-7643.

Xanthos et al., "Reactive Modification of Polyethylene Terephthalate With Polyepxides," *Polymer Engineering and Science*, vol. 41, No. 4, Apr. 2001, pp. 643-655.

Zhang et al. "Preparation and properties of biodegradable poly(lactic acid)/poly(butylene adipate-co-terephthalate) blend with glycidyl methacrylate as reactive processing agent," *J. Mater. Sci.*, vol. 44, 2009, pp. 250-256.

NatureWorks®—PLA Processing Guide for Spinning Fibers, Mar. 15, 2005, 14 pages.

NatureWorks®—Technology Focus Report: Blends of PLA with Other Thermoplasticss, 2007, 6 pages.

NatureWorks®—Technology Focus Report: Toughened PLA, 5 pages.

NatureWorks®—PLA Polymer 6201D (Fiber Melt Spinning)—Product Information—3 pages.

\* cited by examiner

MODIFIED POLYLACTIC ACID FIBERS

RELATED APPLICATIONS

The present application is a divisional of U. S. application Ser. No. 12/856,012 having a filing date of Aug. 13, 2010, the entire contents of which is incorporated herein by reference.

BACKGROUND OF THE INVENTION

Various attempts have been made to form nonwoven webs from biodegradable polymers. Although fibers prepared from biodegradable polymers are known, problems have been encountered with their use. For example, polylactic acid ("PLA") is one of the most common biodegradable and sustainable (renewable) polymers used to form nonwoven webs. Unfortunately, PLA nonwoven webs generally possess a low bond flexibility and high roughness due to the high glass transition temperature and slow crystallization rate of polylactic acid. In turn, thermally bonded PLA nonwoven webs often exhibit low elongations that are not acceptable in certain applications, such as in an absorbent article. Likewise, though polylactic acid may withstand high draw ratios, it requires high levels of draw energy to achieve the crystallization needed to overcome heat shrinkage. In response to these difficulties, plasticizers have been employed in an attempt to reduce the glass transition temperature and improve bonding and softness. One common plasticizer is polyethylene glycol. Unfortunately, polyethylene glycol tends to phase separate from polylactic acid during aging, especially in high humidity and elevated temperature environment, which deteriorates the mechanical properties of the resulting fibers over time. The addition of plasticizers also causes other problems, such as degradation in melt spinning, and a reduction in melt strength and drawability.

As such, a need currently exists for polylactic fibers that exhibit good elongation properties, yet remain strong.

SUMMARY OF THE INVENTION

In accordance with one embodiment of the present invention, a method for forming a polylactic acid fiber is disclosed. The method comprises melt blending a polylactic acid with a polyepoxide modifier to form a thermoplastic composition, wherein the melt blending occurs at a temperature above the melting point of the polylactic acid and below a temperature of about 230° C. The polyepoxide modifier has a number average molecular weight of from about 7,500 to about 250,000 gramps per mole, wherein the amount of the polyepoxide modifier is from about 0.01 wt. % to about 10 wt. %, based on the weight of the polylactic acid. Thereafter, the thermoplastic composition is extruded at a temperature above about 230° C. to facilitate reaction of the polyepoxide modifier with the polylactic acid. The reacted composition is passed through a die to form a fiber.

In accordance with another embodiment of the present invention, a polylactic acid fiber is disclosed that has an average diameter of from about 5 to about 25 micrometers. The fiber comprises a thermoplastic composition formed by reacting polylactic acid with a polyepoxide modifier, wherein the polyepoxide modifier includes a copolymer that contains an epoxy modified (meth)acrylic monomeric component and an olefin monomeric component. The fiber has a glass transition temperature of from about 55° C. to about 65° C., and exhibits a peak elongation of about 50% or more and a tenacity of from about 0.75 to about 6 grams-force per denier.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
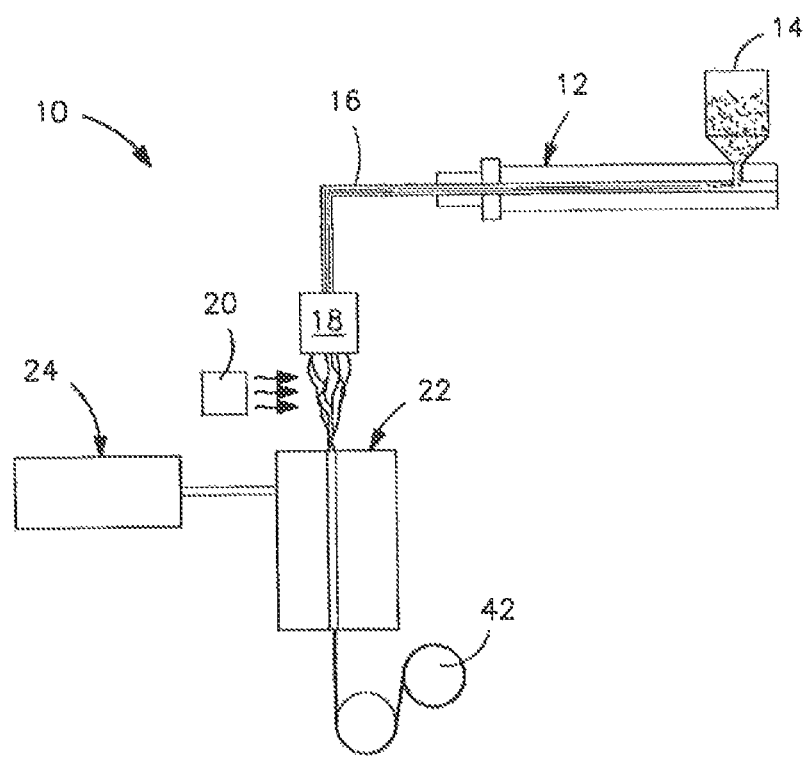
FIG. 1 is a schematic illustration of a process that may be used in one embodiment of the present invention to form fibers.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Definitions

As used herein, the term "biodegradable" or "biodegradable polymer" generally refers to a material that degrades from the action of naturally occurring microorganisms, such as bacteria, fungi, and algae; environmental heat; moisture; or other environmental factors. The biodegradability of a material may be determined using ASTM Test Method 5338.92.

As used herein, the term "fibers" refer to elongated extrudates formed by passing a polymer through a forming orifice such as a die. Unless noted otherwise, the term "fibers" includes both discontinuous fibers having a definite length and substantially continuous filaments. Substantially filaments may, for instance, have a length much greater than their diameter, such as a length to diameter ratio ("aspect ratio") greater than about 15,000 to 1, and in some cases, greater than about 50,000 to 1.

As used herein, the term "monocomponent" refers to fibers formed from one polymer. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The polymers are arranged in substantially constantly positioned distinct zones across the cross-section of the fibers. The components may be arranged in any desired configuration, such as sheath-core, side-by-side, segmented pie, island-in-the-sea, and so forth. Various methods for forming multicomponent fibers are described in U.S. Pat. No. 4,789,592 to Taniquchi et al. and U.S. Pat. No. 5,336,552 to Strack et al., U.S. Pat. No. 5,108,820 to Kaneko, et al., U.S. Pat. No. 4,795,668 to Krueqe, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hoale, et al., U.S. Pat. No. 5,162,074 to Hills, U.S. Pat. No. 5,466,410 to Hills, U.S. Pat. No. 5,069,970 to Larqman, et al., and U.S. Pat. No. 5,057,368 to Larqman, et al., which are incorporated herein in their entirety by reference thereto for all purposes.

As used herein, the term "nonwoven web" refers to a web having a structure of individual fibers that are randomly interlaid, not in an identifiable manner as in a knitted fabric. Nonwoven webs include, for example, meltblown webs, spunbond webs, carded webs, wet-laid webs, airlaid webs, coform webs, hydraulically entangled webs, etc. The basis weight of the nonwoven web may generally vary, but is typically from about 5 grams per square meter ("gsm") to 200 gsm, in some embodiments from about 10 gsm to about 150 gsm, and in some embodiments, from about 15 gsm to about 100 gsm.

As used herein, the term "meltblown" web or layer generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al.; U.S. Pat. No. 4,307,143 to Meitner, et al.; and U.S. Pat. No. 4,707,398 to Wisneski, et al., which are incorporated herein in their entirety by reference thereto for all purposes. Meltblown fibers may be substantially continuous or discontinuous, and are generally tacky when deposited onto a collecting surface.

As used herein, the term "spunbond" web or layer generally refers to a nonwoven web containing small diameter substantially continuous filaments. The filaments are formed by extruding a molten thermoplastic material from a plurality of fine, usually circular, capillaries of a spinnerette with the diameter of the extruded filaments then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond filaments are generally not tacky when they are deposited onto a collecting surface. Spunbond filaments may sometimes have diameters less than about 40 micrometers, and are often between about 5 to about 20 micrometers.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C. or 230° C. Unless otherwise indicated, melt flow rate is measured in accordance with ASTM Test Method D1239 with a Tinius Olsen Extrusion Plastometer.

Thermal Properties:

The melting temperature and glass transition temperature may be determined by differential scanning calorimetry (DSC). The differential scanning calorimeter may be a DSC Q100 Differential Scanning Calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools are used. The samples are placed into an aluminum pan and weighed to an accuracy of 0.01 milligram on an analytical balance. A lid is crimped over the material sample onto the pan. Typically, the resin pellets are placed directly in the weighing pan, and the fibers are cut to accommodate placement on the weighing pan and covering by the lid.

The differential scanning calorimeter is calibrated using an indium metal standard and a baseline correction is performed, as described in the operating manual for the differential scanning calorimeter. A material sample is placed into the test chamber of the differential scanning calorimeter for testing, and an empty pan is used as a reference. All testing is run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program is a 1-cycle test that began with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing is run with a 55-cubic centimeter per minute nitrogen (industrial grade) purge on the test chamber.

The results are evaluated using the UNIVERSAL ANALYSIS 2000 analysis software program, which identified and quantified the glass transition temperature ($T_g$) of inflection, the endothermic and exothermic peaks, and the areas under the peaks on the DSC plots. The glass transition temperature is identified as the region on the plot-line where a distinct change in slope occurred, and the melting temperature is determined using an automatic inflection calculation.

Tensile Properties:

Individual fiber specimens are shortened (e.g., cut with scissors) to 38 millimeters in length, and placed separately on a black velvet cloth. 10 to 15 fiber specimens are collected in this manner. The fiber specimens are then mounted in a substantially straight condition on a rectangular paper frame having external dimension of 51 millimeters×51 millimeters and internal dimension of 25 millimeters×25 millimeters. The ends of each fiber specimen are operatively attached to the frame by carefully securing the fiber ends to the sides of the frame with adhesive tape. Each fiber specimen is then measured for its external, relatively shorter, cross-fiber dimension employing a conventional laboratory microscope, which has been properly calibrated and set at 40× magnification. This cross-fiber dimension is recorded as the diameter of the individual fiber specimen. The frame helps to mount the ends of the sample fiber specimens in the upper and lower grips of a constant rate of extension type tensile tester in a manner that avoids excessive damage to the fiber specimens.

A constant rate of extension type of tensile tester and an appropriate load cell are employed for the testing. The load cell is chosen (e.g., 10N) so that the test value falls within 10-90% of the full scale load. The tensile tester (i.e., MTS SYNERGY 200) and load cell are obtained from MTS Systems Corporation of Eden Prairie, Mich. The fiber specimens in the frame assembly are then mounted between the grips of the tensile tester such that the ends of the fibers are operatively held by the grips of the tensile tester. Then, the sides of the paper frame that extend parallel to the fiber length are cut or otherwise separated so that the tensile tester applies the test force only to the fibers. The fibers are then subjected to a pull test at a pull rate and grip speed of 12 inches per minute. The resulting data is analyzed using a TESTWORKS 4 software program from the MTS Corporation with the following test settings:

| Calculation Inputs | | Test Inputs | |
| --- | --- | --- | --- |
| Break mark drop | 50% | Break sensitivity | 90% |
| Break marker elongation | 0.1 in | Break threshold | 10 $g_f$ |
| Nominal gage lenhth | 1 in | Data Acq. Rate | 10 Hz |
| Slack pre-load | 1 $lb_f$ | Denier length | 9000 m |
| Slope segment length | 20% | Density | 1.25 g/cm$^3$ |
| Yield offset | 0.20% | Initial speed | 12 in/min |
| Yield segment length | 2% | Secondary speed | 2 in/min |

The tenacity values are expressed in terms of gram-force per denier. Peak elongation (% strain at break) is also measured.

Moisture Content

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§ X2.1.2) may be 130° C., the sample size (§ X2.1.1) may be 2 to 4 grams, and the vial purge time (§ X2.1.4) may be 30 seconds. Further, the ending criteria (§ X2.1.3) may be defined as a "prediction" mode, which means that the test is ended when the built-in programmed criteria (which mathematically calculates the end point moisture content) is satisfied.

Detailed Description

Generally speaking, the present invention is directed to a method for forming polylactic acid fibers that includes blending polylactic acid with a polyepoxide modifier to form a thermoplastic composition, extruding the thermoplastic composition through a die, and thereafter passing the extruded composition through a die to form a fiber. Without intending to be limited by theory, it is believed that the polyepoxide modifier reacts with the polylactic acid and results in branching of its polymer backbone, thereby improving its melt strength and stability during fiber spinning without significantly reducing glass transition temperature. The reaction-induced branching can also increase molecular weight, which may lead to improved fiber ductility and the ability to better dissipate energy when subjected to an elongation force. To minimize premature reaction, the polylactic acid and polyepoxide modifier are first blended together at a relatively low temperature(s). Nevertheless, a relatively high shear rate may be employed during blending to induce chain scission of the polylactic acid backbone, thereby making more hydroxyl and/or carboxyl groups available for subsequent reaction with the polyepoxide modifier. Once blended, the temperature(s) employed during extrusion of the blended composition can be selected to both melt the composition and initiate a reaction of the polyepoxide modifier with hydroxyl and/or carboxyl groups of the polylactic acid. Through selective control over this method, the present inventors have discovered that the resulting fibers may exhibit good mechanical properties, both during and after melt spinning.

Various embodiments of the present invention will now be described in more detail.

I. Thermoplastic Composition

A. Polylactic Acid

Polylactic acid may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.) to provided a variety of different of benefits, such as processing, fiber formation, etc.

In one particular embodiment, the polylactic acid has the following general structure:

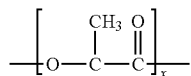

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458, which are incorporated herein in their entirety by reference thereto for all purposes.

The polylactic acid typically has a melting point of from about 140° C. to about 260° C., in some embodiments from about 150° C. to about 250° C., and in some embodiments, from about 160° C. to about 220° C. Such polylactic acids are useful in that they biodegrade at a fast rate. The glass transition temperature ("$T_g$") of the polylactic acid may be relatively high, such as from about 40° C. to about 80° C., in some embodiments from about 50° C. to about 80° C., and in some embodiments, from about 55° C. to about 65° C. As discussed in more detail above, the melting temperature and glass transition temperature may be determined using differential scanning calorimetry ("DSC") in accordance with ASTM D-3417.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

B. Polyepoxide Modifier

The polyepoxide modifier is a polymer that contains, on average, at least two oxirane rings per molecule. Without intending to be limited by theory, it is believed that the polyepoxide molecules can induce chain extension of the polylactic acid under certain conditions, thereby improving its melt strength without significantly reducing glass transition temperature. Chain extension may occur through a variety of different reaction pathways. For instance, the modifier may enable a nucleophilic ring-opening reaction via the carboxyl terminal group of the polylactic acid (esterification) or via a hydroxyl group (etherification). Oxazoline side reactions may likewise occur to form ester-amide moieties. Through such reactions, the molecular weight of the polylactic acid may be increased to counteract the degradation often observed during melt processing. While it is desirable to induce a reaction with polylactic acid as described above, the present inventors have discovered that the too much of a reaction can lead to crosslinking between polylactic backbones. If such crosslinking is allowed to proceed to a significant extent, the resulting polymer blend can become brittle and difficult to draw into fibers with the desired strength and elongation properties. In this regard, the present inventors have discovered that polyepoxide modifiers having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide modifier of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide modifier may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it can not only result in chain extension of the polylactic acid, but also help to achieve the desired blend morphology, as will be described in more detail below. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide modifier includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide modifier is a terpolymer formed from an epoxy-functional (meth)acrylic monomeric component, α-olefin monomeric component, and non-epoxy functional (meth)acrylic monomeric component. For example, the polyepoxide modifier may be poly(ethylene-co-methylacrylate-co-glycidyl methacrylate), which has the following structure:

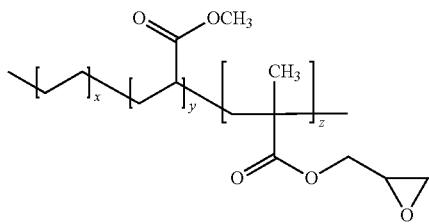

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164, which is incorporated herein in its entirety by reference thereto for all purposes. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with polylactic acid, but too high of a content may reduce the melt flow rate to such an extent that the polyepoxide modifier adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide modifier that may be used in the present invention is commercially available from Arkema under the name Lotader® AX8950. Lotader® AX8950 has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %.

In addition to controlling the type and relative content of the monomers used to form the polyepoxide modifier, the overall weight percentage may also be controlled to achieve the desired benefits. For example, if the modification level is too low, the desired increase in melt strength and mechanical properties may not be achieved. The present inventors have also discovered, however, that if the modification level is too high, fiber drawing may be restricted due to strong molecular interactions (e.g., crosslinking) and physical network formation by the epoxy functional groups. Thus, the polyepoxide modifier is typically employed in an amount of from about 0.01 wt. % to about 10 wt. %, in some embodiments from about 0.05 wt. % to about 5 wt. %, in some embodiments from about 0.1 wt. % to about 1.5 wt. %, and in some embodiments, from about 0.2 wt. % to about 0.8 wt. %, based on the weight of the polylactic acid employed in the composition. Depending on what other components are employed, the concentration of the polyepoxide modifier in the entire thermoplastic composition may be the same or less than the ranges noted above. In certain embodiments, for example, the polyepoxide modifier constitutes from about 0.01 wt. % to about 10 wt. %, in some embodiments from about 0.05 wt. % to about 5 wt. %, in some embodiments from about 0.1 wt. % to about 1.5 wt. %, and in some embodiments, from about 0.2 wt. % to about 0.8 wt. %, based on the total weight of the composition. Likewise, polylactic acid typically constitutes about 70 wt. % or more, in some embodiments, from about 80 wt. % to about 99 wt. %, and in some embodiments, from about 85 wt. % to about 95 wt. % of the composition.

C. Toughening Additive

Although not necessarily required, the thermoplastic composition of the present invention may also contain one or more polymeric toughening additives to improve the melt strength and spinning stability of the composition during fiber formation. One benefit of the present invention is that when such additives are employed, the hydrophobic portion of the polyepoxide modifier (e.g., olefin monomer) may also interact with the toughening additive to form a substantially homogeneous compatibilized nanodispersion of the toughening additive within the polylactic acid matrix. Such uniform distribution helps achieve good mechanical properties of the resulting fibers.

Due to its polymeric nature, the toughening additive possesses a relatively high molecular weight that can help improve the melt strength and stability of the thermoplastic composition. It is typically desired that the polymeric toughening additive is generally immiscible with the polylactic acid. In this manner, the toughening additive can become dispersed as discrete phase domains within a continuous phase of the polylactic acid. The discrete domains are capable of absorbing energy that arises from stress imparted during elongation of the composition during fiber drawing, which increases the overall toughness and strength of the resulting fibers. While the polymers are generally immiscible, the toughening additive may nevertheless be selected to have a solubility parameter that is relatively similar to that of polylactic acid. This generally improves the interfacial adhesion and physical interaction of the boundaries of the discrete and continuous phases, and thus reduces the likelihood that the composition will fracture upon stretching. In this regard, the ratio of the solubility parameter for polylactic acid to that of the toughening additive is typically from about 0.5 to about 1.5, and in some embodiments, from about 0.8 to about 1.2. For example, the polymeric toughening additive may have a solubility parameter of from about 15 to about 30 MJoules$^{1/2}$m$^{3/2}$, and in some embodiments, from about 18 to about 22 MJoules$^{1/2}$/m$^{3/2}$, while the polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{(\Delta H_v - RT)/V_m}$$

where:
A Hv=heat of vaporization
R=Ideal Gas constant
T=Temperature
Vm=Molecular Volume The Hildebrand solubility parameters for many polymers are also available from the Solubility Handbook of Plastics, by Wyeych (2004), which is incorporated herein by reference.

The polymeric toughening additive may also be selected to have a certain melt flow rate (or viscosity) to ensure that the discrete domains can be adequately maintained. For example, if the melt flow rate of the toughening additive is too high, it tends to flow and disperse uncontrollably through the continuous phase. This results in lamellar or plate-like domains that are difficult to maintain and also likely to prematurely fracture during fiber drawing. Conversely, if the melt flow rate of the toughening additive is too low, it tends to clump together and form very large elliptical domains, which are difficult to disperse during blending. This may cause uneven distribution of the toughening additive through the entirety of the continuous phase. In this regard, the ratio of the melt flow rate of the toughening additive to the melt flow rate of the polylactic acid is typically from about 0.2 to about 8, in some embodiments from about 0.5 to about 6, and in some embodiments, from about 1 to about 5. The polymeric toughening additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the polymeric toughening additive may also be selected to achieve the desired increase in fiber toughness. For example, the toughening additive may have a relatively low Young's modulus of elasticity in comparison to the polylactic acid. For example, the ratio of the modulus of elasticity of polylactic acid to that of the toughening additive is typically from about 1 to about 250, in some embodiments from about 2 to about 100, and in some embodiments, from about 2 to about 50. The modulus of elasticity of the toughening additive may, for instance, range from about 2 to about 500 Megapascals (MPa), in some embodiments from about 5 to about 300 MPa, and in some embodiments, from about 10 to about 200 MPa. To the contrary, the modulus of elasticity of polylactic acid is typically from about 800 MPa to about 2000 MPa. The polymeric toughening additive may also exhibit a peak elongation (i.e., the percent elongation of the polymer at its peak load) greater than polylactic acid. For example, the polymeric toughening additive of the present invention may exhibit a peak elongation of about 50% or more, in some embodiments about 100% or more, in some embodiments from about 100% to about 2000%, and in some embodiments, from about 250% to about 1500%.

While a wide variety of polymeric additives may be employed that have the properties identified above, particularly suitable examples of such polymers may include, for instance, polyolefins (e.g., polyethylene, polypropylene, polybutylene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.; polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents;

1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al., which are incorporated herein in their entirety by reference thereto for all purposes. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al., which are incorporated herein in their entirety by reference thereto for all purposes.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obileski et al.; U.S. Pat. No. 5,272,236 to Lai et al.; and U.S. Pat. No. 6,090,325 to Wheat, et al., which are incorporated herein in their entirety by reference thereto for all purposes. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-fluorenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

When employed, the amount of the toughening additive is typically from about 1 wt. % to about 25 wt. %, in some embodiments from about 2 wt. % to about 20 wt. %, and in some embodiments, from about 5 wt. % to about 15 wt. % of the thermoplastic composition.

D. Other Components

One beneficial aspect of the present invention is that good mechanical properties (e.g., elongation) may be provided without the need for conventional plasticizers, such as alkylene glycols (e.g., polyethylene glycols, such as those available from Dow Chemical under the name Carbowax™), alkane diols, and alkylene oxides that possess one or more hydroxyl groups which attack the ester linkages of the polylactic acid and result in hydrolytic degradation. Other examples of such plasticizers are described in U.S. Pat. No. 2010/0048082 to Topolkaraev, et al., which is incorporated herein in its entirety by reference thereto for all purposes. The thermoplastic composition may be substantially free of such plasticizers. Nevertheless, it should be understood that plasticizers may be used in certain embodiments of the present invention. When utilized, however, the plasticizers are typically present in an amount of less than about 10 wt. %, in some embodiments from about 0.1 wt. % to about 5 wt. %, and in some embodiments, from about 0.2 wt. % to about 2 wt. % of the thermoplastic composition.

Of course, other ingredients may be utilized for a variety of different reasons. For instance, materials that may be used include, without limitation, catalysts, pigments, antioxidants, stabilizers, surfactants, waxes, flow promoters, solid solvents, compatibilizers, nucleating agents (e.g., titanium dioxide, calcium carbonate, etc.), particulates, and other materials added to enhance the processability of the thermoplastic composition. When utilized, it is normally desired that the amounts of these additional ingredients are minimized to ensure optimum compatibility and cost-effectiveness. Thus, for example, it is normally desired that such ingredients constitute less than about 10 wt. %, in some embodiments less than about 8 wt. %, and in some embodiments, less than about 5 wt. % of the thermoplastic composition.

It should also be understood that other components may be included in the thermoplastic composition. One such component that may be employed is an additional biodegradable polyester, including aliphatic polyesters, such as polycaprolactone, polyesteramides, modified polyethylene terephthalate, polylactic acid (PLA) and its copolymers, terpolymers based on polylactic acid, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.), and so forth.

II. Blending

Neat polylactic acid will generally absorb water from the ambient environment such that it has a moisture content of about 500 too 600 parts per million ("ppm"), or even greater, based on the dry weight of the starting polylactic acid. Moisture content may be determined in a variety of ways as is known in the art, such as in accordance with ASTM D 7191-05, such as described above. Because the presence of water during melt processing can hydrolytically degrade polylactic acid and reduce its molecular weight, it is sometimes desired to dry the polylactic acid prior to blending. In most embodiments, for example, it is desired that the polylactic acid have a moisture content of about 200 parts per million ("ppm") or less, in some embodiments from about 1 to about 100 ppm, and in some embodiments, from about 2 to about 80 ppm prior to blending with the polyepoxide modifier. Drying of the polylactic acid may occur, for instance, at a temperature of from about 50° C. to about 100° C., and in some embodiments, from about 70° C. to about 80° C.

The blending of the components of the thermoplastic composition may be performed using any of a variety of known techniques. In one embodiment, for example, the raw materials (e.g., polylactic acid and polyepoxide modifier) may be supplied separately or in combination. For instance, the raw materials may first be dry mixed together to form an essentially homogeneous dry mixture. The raw materials may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the polylactic acid and polyepoxide modifier may be fed to the same or different feeding ports of the twin-screw extruder and melt blended to form a substantially homogeneous melted mixture. If desired, additives (e.g., toughening additives) may also be injected into the polymer melt and/or separately fed into the extruder at a different point along its length. Alternatively, the additives may be pre-blended with the polylactic acid and/or the polyepoxide modifier.

Regardless of the particular processing technique chosen, the raw materials are blended under high shear/pressure and low heat to ensure sufficient dispersion without causing the polyepoxide modifier to prematurely undergo a substantial reaction with the polylactic acid. For example, blending typically occurs at a temperature of above the melting point of the polylactic acid but below the temperature used to initiate the reaction of the polyepoxide modifier to a significant extent (e.g., about 230° C.), such as from about 170° C. to about 230° C., in some embodiments from about 180° C. to about 220° C., and in some embodiments, from about 185° C. to about 215° C. Likewise, the apparent shear rate during melt processing may range from about 100 seconds$^{-1}$ to about 10,000 seconds$^{-1}$, in some embodiments from about 200 seconds$^{-1}$ to about 5000 seconds$^{-1}$, and in some embodiments, from about 500 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

Due to the selective control over the polyepoxide (e.g., activity, molecular weight, etc.) and the particular melt blending conditions, the present inventors have discovered that a morphology may be formed that enhances the reactivity with polylactic acid. More particularly, the resulting morphology may have a plurality of discrete phase domains of the polyepoxide modifier distributed throughout a continuous polylactic acid matrix. The domains may have a variety of different shapes, such as elliptical, spherical, cylindrical, etc. Regardless of the shape, however, the size of an individual domain, after blending, is small to provide an increased surface area for subsequent reaction with the polylactic acid. For example, the size of a domain (e.g., length) typically ranges from about 10 to about 1000 nanometers, in some embodiments from about 20 to about 800 nanometers, in some embodiments from about 40 to about 600 nanometers, and in some embodiments from about 50 to about 400 nanometers. The optional toughening additive may also form discrete domains within the polylactic acid matrix. When formed, such domains are typically larger than the polyepoxide domains. For example, the toughening additive domains may have a dimension (e.g., length) of from about 0.5 μm to about 30 μm, and in some embodiments from about 1 μm to about 10 μm. Of course, it should be also understood that the domains may be formed by a combination of the polyepoxide, toughening additive, and/or other components of the blend.

III. Reaction Technique

The reaction of the blended polyepoxide modifier and polylactic acid is conducted while the starting polymers are in the melt phase ("melt processing") to minimize the need for additional solvents and/or solvent removal processes. More specifically, the blend may be supplied to an extruder (e.g., single screw) that includes a screw rotatably mounted and received within a barrel (e.g., cylindrical barrel), which may be heated. The blend is moved downstream from a feed end to a discharge end by forces exerted by rotation of the screw. Such screw extruders are typically divided into three sections along the length of the screw. The first section is a feed section where the solid material is introduced to the screw. The second section is a melting section where a majority of the melting of the solid occurs. Within this section, the screw generally possesses a tapered diameter to enhance melting of the polymer. The third section is the mixing section, which delivers the molten material in a constant amount for extrusion. The configuration of the screw is not particularly critical to the present invention and it may contain any number and/or orientation of threads and channels as is known in the art.

Before exiting the extruder through a die, the molten plastic may also travel through one or more screens ("screen pack") within the barrel that are optionally reinforced by a breaker plate. In addition to removing contaminants and unmelted solids, the screen pack/breaker plate assembly can help create back pressure in the barrel to enhance the melt uniformity and mixing of the polymer. The amount of head pressure can be controlled by varying the configuration of the screen pack (the number of screens, hole size of the screens, etc.). The screen pack may include, for instance, from 2 to 15 screens, in some embodiments from 3 to 10 screens, and in some embodiments, from 4 to 8 screens. When multiple screens are employed, the upstream screens are generally of a size to collect only large particles while subsequent downstream screens are of a size to collect increasingly smaller particles. Although screens of various sizes may be employed, it is typically desired that the pack employ at least one screen having openings of a relatively small size to create a high enough back pressure in the barrel. For example, the screen may contain openings having an average width (or diameter) of about 100 micrometers or less, in some embodiments about 75 micrometers or less, and in some embodiments, from about 1 to about 50 micrometers. Preferably, the pack employs multiple screens (e.g., 3 or more) having openings of this size.

The speed of the screw may also be selected to achieve the desired residence time, shear rate, melt processing temperature, etc. For example, the screw speed may range from about 50 to about 200 revolutions per minute ("rpm"), in some embodiments from about 70 to about 150 rpm, and in some embodiments, from about 80 to about 120 rpm. This may result in a temperature that is greater than that normally used to extrude polylactic acid and sufficient high to initiate reaction of the polyepoxide modifier, such as above about 230° C. For example, the extruder may employ one or multiple zones, at least one of which operates at a temperature of from about 230° C. to about 350° C., in some embodiments from about 235° C. to about 300° C., and in some embodiments, from about 240° C. to about 280° C.

The melt shear rate, and in turn the degree to which the reaction is initiated, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers. Regardless of the particular elements selected, the use of one more mixing elements may create intensive melt shear rates that help initiate the desired reaction. Typically, the apparent shear rate during melt processing may range from about 100 seconds$^{-1}$ to about 10,000 seconds$^{-1}$, in some embodiments from about 200 seconds$^{-1}$ to about 5000 seconds$^{-1}$, and in some embodiments, from about 500 seconds$^{-1}$ to about 1200 seconds$^{-1}$. Of course, other variables, such as the residence time during melt processing, which is inversely proportional to throughput rate, may also be controlled to achieve the desired degree of reaction.

In addition to controlling the shear conditions, the present inventors have also discovered that the moisture content of the precursor blend may also be controlled to help achieve the desired degree of reaction. Without intending to be limited by theory, it is believed that water can act as a catalyst for the reaction of the polyepoxide and the polylactic acid. Nevertheless, too great of a moisture content can lead to degradation of the polylactic acid and a reduction in its molecular weight. In this regard, the present inventors have discovered that the moisture content of the precursor blend may be controlled to a moisture content of from about 100 to about 500 ppm, in some embodiments from about 125 to about 400 ppm, and in some embodiments, from about 150 to about 300 ppm. Such moisture contents may be achieved by drying, such as at a temperature of from about 40° C. to about 80° C., and in some embodiments, from about 50° C. to about 70° C.

Although differing from the starting polymer in certain properties, the reacted polylactic acid may nevertheless retain other properties of the starting polymer. For example, because the thermoplastic composition used to form the fibers does not generally contain a plasticizer, the glass transition temperature ($T_g$) of the reacted composition is typically the same as the glass transition temperature of polylactic acid. That is, the reacted thermoplastic composition may have a $T_g$ of from about 50° C. to about 80° C., and in some embodiments, from about 55° C. to about 65° C. The melting point of the thermoplastic composition may also range from about 150° C. to about 250° C., and in some embodiments, from about 160° C. to about 220° C.

IV. Fiber Formation

Fibers formed from the reacted thermoplastic composition may generally have any desired configuration, including monocomponent and multicomponent (e.g., sheath-core configuration, side-by-side configuration, segmented pie configuration, island-in-the-sea configuration, and so forth). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer that is not generally considered biodegradable, such as polyolefins, e.g., polyethylene, polypropylene, polybutylene, and so forth; polytetrafluoroethylene; polyesters, e.g., polyethylene terephthalate, and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes. More desirably, however, the additional polymer is biodegradable, such as aliphatic polyesters, such as polyesteramides, modified polyethylene terephthalate, polyglycolic acid, polyalkylene carbonates (such as polyethylene carbonate), polyhydroxyalkanoates (PHA), polyhydroxybutyrates (PHB), polyhydroxyvalerates (PHV), polyhydroxybutyrate-hydroxyvalerate copolymers (PHBV), and polycaprolactone, and succinate-based aliphatic polymers (e.g., polybutylene succinate, polybutylene succinate adipate, and polyethylene succinate); aromatic polyesters; or other aliphatic-aromatic copolyesters.

Any of a variety of processes may be used to form fibers in accordance with the present invention. For example, the thermoplastic composition described above may be extruded through a spinneret, quenched, and drawn into the vertical passage of a fiber draw unit. The reaction of the polyepoxide modifier and polylactic acid may occur during this process, or it may occur prior to introduction to the fiber formation line. Once formed, the fibers may then be cut to form staple fibers having an average fiber length in the range of from about 3 to about 80 millimeters, in some embodiments from about 4 to about 65 millimeters, and in some embodiments, from about 5 to about 50 millimeters. The staple fibers may then be incorporated into a nonwoven web as is known in the art, such as bonded carded webs, through-air bonded webs, etc. The fibers may also be deposited onto a foraminous surface to form a nonwoven web.

Referring again to FIG. 1, for example, one embodiment of a method for forming fibers is shown in more detail. In this particular embodiment, the pre-blended thermoplastic composition is extruded at a relatively high temperature to induce the reaction between the epoxy functional group of the modifier and the polylactic acid, as well as to initiate formation of the fibers. For instance, the polylactic acid/polyepoxide modifier blend is fed into an extruder 12 from a hopper 14. The blend may be provided to the hopper 14 using any conventional technique. As described in detail above, the extruder 12 is heated to a temperature sufficient to extrude the melted polymer and initiate the reaction between the polyepoxide modifier and the polylactic acid. The extruded composition is then passed through a polymer conduit 16 to a spinneret 18. For example, the spinneret 18 may include a housing containing a spin pack having a plurality of plates stacked one on top of each other and having a pattern of openings arranged to create flow paths for directing polymer components. The spinneret 18 also has openings arranged in one or more rows. The openings form a downwardly extruding curtain of filaments when the polymers are extruded therethrough. The process 10 also employs a quench blower 20 positioned adjacent the curtain of fibers extending from the spinneret 18. Air from the quench air blower 20 quenches the fibers extending from the spinneret 18. The quench air may be directed from one side of the fiber curtain as shown in FIG. 1 or both sides of the fiber curtain.

After quenching, the fibers are drawn into the vertical passage of a fiber draw unit 22. Fiber draw units or aspirators for use in melt spinning polymers are well-known in the art. Suitable fiber draw units for use in the process of the present invention include a linear fiber aspirator of the type shown in U.S. Pat. Nos. 3,802,817 and 3,423,255, which are incorporated herein in their entirety by reference thereto for all relevant purposes. The fiber draw unit 22 generally includes an elongated vertical passage through which the fibers are drawn by aspirating air entering from the sides of the passage and flowing downwardly through the passage. A heater or blower 24 supplies aspirating air to the fiber draw unit 22. The aspirating air draws the fibers and ambient air through the fiber draw unit 22. The flow of gas causes the fibers to draw or attenuate which increases the molecular orientation or crystallinity of the polymers forming the fibers. The fibers are deposited through the outlet opening of the fiber draw unit 22 and onto a godet roll 42. Due to the high strength of the fibers of the present invention, high draw ratios may be employed in the present invention. The draw ratio is the linear speed of the fibers after drawing (e.g., linear speed of the godet roll 42 or a foraminous surface (not shown) divided by the linear speed of the fibers after extrusion. For example, the draw ratio may be calculated in certain embodiments as follows:

Draw Ratio=$A/B$ wherein,

A is the linear speed of the fiber after drawing (i.e., godet speed) and is directly measured; and B is the linear speed of the extruded fiber and can be calculated as follows:

Extruder linear fiber speed=$C/(25*\pi*D*E^2)$ wherein,

C is the throughput through a single hole (grams per minute);

D is the melt density of the polymer (grams per cubic centimeter); and

E is the diameter of the orifice (in centimeters) through which the fiber is extruded. In certain embodiments of the present invention, the draw ratio may be from about 200:1 to about 7500:1, in some embodiments from about 500:1 to about 6500:1, and in some embodiments, from about 1000:1 to about 6000:1.

If desired, the fibers collected on the godet roll 42 may optionally be subjected to additional in line processing and/or converting steps (not shown) as will be understood by those skilled in the art. For example, staple fibers may be formed by "cold drawing" the collected fibers at a temperature below their softening temperature to the desired diameter, and thereafter crimping, texturizing, and/or and cutting the fibers to the desired fiber length.

Regardless of the particular manner in which they are formed, the present inventors have discovered that fiber drawing significantly increases the axial dimension of the reacted discrete domains so that they have a generally linear, elongated shape. The elongated domains may have an axial dimension that is about 10% or more, in some embodiments from about 50% to about 1000%, and in some embodiments, from about 100% to about 500% greater than the axial dimension of the domains prior to fiber drawing. The axial dimension after fiber drawing may, for instance, range from about 10 µm to about 300 µm, in some embodiments from about 40 µm to about 250 µm, and in some embodiments from about 50 µm to about 200 µm. The domains may also be relatively thin and thus have a small dimension in a direction orthogonal to the axial dimension (i.e., cross-sectional dimension). For instance, the cross-sectional dimension may be from about 0.02 to about 75 micrometers, in some embodiments from about 0.1 to about 40 micrometers, and in some embodiments, from 0.4 to about 20 micrometers in length. This may result in an aspect ratio for the domains (the ratio of the axial dimension to the cross-sectional dimension) of from about 3 to about 200, in some embodiments from about 5 to about 100, and in some embodiments, from about 5 to about 50.

The presence of these elongated domains is indicative of the ability of the thermoplastic composition to absorb energy imparted during fiber drawing. In this manner, the composition is not as brittle as neat polylactic acid and thus can release upon the application of strain, rather than fracture. By releasing under strain, the polymer may continue to function as a load bearing member even after the fiber has exhibited substantial elongation. In this regard, the fibers of the present invention are capable of exhibiting improved "peak elongation" properties, i.e., the percent elongation of the fiber at its peak load. For example, the fibers of the present invention may exhibit a peak elongation of about 25% or more, in some embodiments about 30% or more, in some embodiments from about 40% to about 350%, and in some embodiments, from about 50% to about 250%. Such elongations may be achieved for fibers having a wide variety of average diameters, such as those ranging from about 0.1 to about 50 micrometers, in some embodiments from about 1 to about 40 micrometers, in some embodiments from about 2 to about 25 micrometers, and in some embodiments, from about 5 to about 15 micrometers.

While possessing the ability to extend under strain, the fibers of the present invention can also remain relatively strong. One parameter that is indicative of the relative strength of the fibers of the present invention is "tenacity", which indicates the tensile strength of a fiber expressed as force per unit linear density. For example, the fibers of the present invention may have a tenacity of from about 0.75 to about 6.0 grams-force ("$g_f$") per denier, in some embodiments from about 1.0 to about 4.5 $g_f$ per denier, and in some embodiments, from about 1.5 to about 4.0 $g_f$ per denier. The denier of the fibers may vary depending on the desired application. Typically, the fibers are formed to have a denier per filament (i.e., the unit of linear density equal to the mass in grams per 9000 meters of fiber) of less than about 6, in some embodiments less than about 3, and in some embodiments, from about 0.5 to about 3.

If desired, the fibers of the present invention may also be formed into a coherent web structure by randomly depositing the fibers onto a forming surface (optionally with the aid of a vacuum) and then bonding the resulting web using any known technique. For example, an endless foraminous forming surface may be positioned below the fiber draw unit and receive the fibers from an outlet opening. A vacuum may be positioned below the forming surface to draw the fibers and consolidate the unbonded nonwoven web. Once formed, the nonwoven web may then be bonded using any conventional technique, such as with an adhesive or autogenously (e.g., fusion and/or self-adhesion of the fibers without an applied external adhesive). Autogenous bonding, for instance, may be achieved through contact of the fibers while they are semi-molten or tacky, or simply by blending a tackifying resin and/or solvent with the polylactic acid(s) used to form the fibers. Suitable autogenous bonding techniques may include ultrasonic bonding, thermal bonding, through-air bonding, calendar bonding, and so forth. For example, the web may be further bonded or embossed with a pattern by a thermo-mechanical process in which the web is passed between a heated smooth anvil roll and a heated pattern roll. The pattern roll may have any raised pattern which provides the desired web properties or appearance. Desirably, the pattern roll defines a raised pattern which defines a plurality of bond locations which define a bond area between about 2% and 30% of the total area of the roll. Exemplary bond patterns include, for instance, those described in U.S. Pat. No. 3,855,046 to Hansen et al., U.S. Pat. No. 5,620,779 to Levy et al., U.S. Pat. No. 5,962,112 to Haynes et al., U.S. Pat. No. 6,093,665 to Sayovitz et al., as well as U.S. Design Pat. No. 428,267 to Romano et al.; U.S. Pat. No. 390,708 to Brown; U.S. Pat. No. 418,305 to Zander, et al.; U.S. Pat. No. 384,508 to Zander, et al.; U.S. Pat. No. 384,819 to Zander, et al.; U.S. Pat. No. 358,035 to Zander, et al.; and U.S. Pat. No. 315,990 to Blenke, et al., all of which are incorporated herein in their entirety by reference thereto for all purposes. The pressure between the rolls may be from about 5 to about 2000 pounds per lineal inch. The pressure between the rolls and the temperature of the rolls is balanced to obtain desired web properties or appearance while maintaining cloth like properties. As is well known to those skilled in the art, the temperature and pressure required may vary depending upon many factors including but not limited to, pattern bond area, polymer properties, fiber properties and nonwoven properties.

In addition to spunbond webs, a variety of other nonwoven webs may also be formed from the thermoplastic composition in accordance with the present invention, such as meltblown webs, bonded carded webs, wet-laid webs, airlaid webs, coform webs, hydraulically entangled webs, etc. For example, the thermoplastic composition may be extruded through a plurality of fine die capillaries into a converging high velocity gas (e.g., air) streams that attenuate the fibers to reduce their diameter. Thereafter, the meltblown fibers are carried by the high velocity gas stream and are deposited on a collecting surface to form a web of randomly dispersed meltblown fibers. Alternatively, the polymer may be formed into a carded web by placing bales of fibers formed from the thermoplastic composition into a picker that separates the fibers. Next, the fibers are sent through a combing or carding unit that further breaks apart and aligns the fibers in the machine direction so as to form a machine direction-oriented fibrous nonwoven web. Once formed, the nonwoven web is typically stabilized by one or more known bonding techniques.

If desired, the nonwoven web may also be a composite that contains a combination of the thermoplastic composition fibers and other types of fibers (e.g., staple fibers, filaments, etc). For example, additional synthetic fibers may be utilized, such as those formed from polyolefins, e.g., polyethylene, polypropylene, polybutylene, and so forth; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; etc. If desired, biodegradable polymers, such as poly(glycolic acid) (PGA), poly(lactic acid) (PLA), poly($\beta$-malic acid) (PMLA), poly($\varepsilon$-caprolactone) (PCL), poly($\rho$-dioxanone) (PDS), poly(butylene succinate) (PBS), and poly(3-hydroxybutyrate) (PHB), may also be employed. Some examples of known synthetic fibers include sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del. Polylactic acid staple fibers may also be employed, such as those commercially available from Far Eastern Textile, Ltd. of Taiwan.

The composite may also contain pulp fibers, such as high-average fiber length pulp, low-average fiber length pulp, or mixtures thereof. One example of suitable high-average length fluff pulp fibers includes softwood kraft pulp fibers. Softwood kraft pulp fibers are derived from coniferous trees and include pulp fibers such as, but not limited to, northern, western, and southern softwood species, including redwood, red cedar, hemlock, Douglas fir, true firs, pine (e.g., southern pines), spruce (e.g., black spruce), bamboo, combinations thereof, and so forth. Northern softwood kraft pulp fibers may be used in the present invention. An example of commercially available southern softwood kraft pulp fibers suitable for use in the present invention include those available from Weyerhaeuser Company with offices in Federal Way, Washington under the trade designation of "NF-405." Another suitable pulp for use in the present invention is a bleached, sulfate wood pulp containing primarily softwood fibers that is available from Bowater Corp. with offices in Greenville, S.C. under the trade name CoosAbsorb S pulp. Low-average length fibers may also be used in the present invention. An example of suitable low-average length pulp fibers is hardwood kraft pulp fibers. Hardwood kraft pulp fibers are derived from deciduous trees and include pulp fibers such as, but not limited to, eucalyptus, maple, birch, aspen, etc. Eucalyptus kraft pulp fibers may be particularly desired to increase softness, enhance brightness, increase opacity, and change the pore structure of the sheet to increase its wicking ability. Bamboo or cotton fibers may also be employed.

Nonwoven composites may be formed using a variety of known techniques. For example, the nonwoven composite may be a "coform material" that contains a mixture or stabilized matrix of the thermoplastic composition fibers and an absorbent material. As an example, coform materials may be made by a process in which at least one meltblown die head is arranged near a chute through which the absorbent materials are added to the web while it is forming. Such absorbent materials may include, but are not limited to, pulp fibers, superabsorbent particles, inorganic and/or organic absorbent materials, treated polymeric staple fibers, and so forth. The relative percentages of the absorbent material may vary over a wide range depending on the desired characteristics of the nonwoven composite. For example, the nonwoven composite may contain from about 1 wt. % to about 60 wt. %, in some embodiments from 5 wt. % to about 50 wt. %, and in some embodiments, from about 10 wt. % to about 40 wt. % thermoplastic composition fibers. The nonwoven composite may likewise contain from about 40 wt. % to about 99 wt. %, in some embodiments from 50 wt. % to about 95 wt. %, and in some embodiments, from about 60 wt. % to about 90 wt. % absorbent material. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.; which are incorporated herein in their entirety by reference thereto for all purposes.

Nonwoven laminates may also be formed in the present invention in which one or more layers are formed from the thermoplastic composition. For example, the nonwoven web of one layer may be a spunbond that contains the thermoplastic composition, while the nonwoven web of another layer contains thermoplastic composition, other biodegradable polymer(s), and/or any other polymer (e.g., polyolefins). In one embodiment, the nonwoven laminate contains a meltblown layer positioned between two spunbond layers to form a spunbond/meltblown/spunbond ("SMS") laminate. If desired, the spunbond layer(s) may be formed from the thermoplastic composition. The meltblown layer may be formed from the thermoplastic composition, other biodegradable polymer(s), and/or any other polymer (e.g., polyolefins). Various techniques for forming SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al., as well as U.S. Patent Application Publication No. 2004/0002273 to Fitting, et al., all of which are incorporated herein in their entirety by reference thereto for all purposes. Of course, the nonwoven laminate may have other configuration and possess any desired number of meltblown and spunbond layers, such as spunbond/meltblown/meltblown/spunbond laminates ("SMMS"), spunbond/meltblown laminates ("SM"), etc. Although the basis weight of the nonwoven laminate may be tailored to the desired application, it generally ranges from about 10 to about 300 grams per square meter ("gsm"), in some embodiments from about 25 to about 200 gsm, and in some embodiments, from about 40 to about 150 gsm.

If desired, the nonwoven web or laminate may be applied with various treatments to impart desirable characteristics. For example, the web may be treated with liquid-repellency additives, antistatic agents, surfactants, colorants, antifogging agents, fluorochemical blood or alcohol repellents, lubricants, and/or antimicrobial agents. In addition, the web may be subjected to an electret treatment that imparts an electrostatic charge to improve filtration efficiency. The charge may include layers of positive or negative charges trapped at or near the surface of the polymer, or charge clouds stored in the bulk of the polymer. The charge may also include polarization charges that are frozen in alignment of the dipoles of the molecules. Techniques for subjecting a fabric to an electret treatment are well known by those skilled in the art. Examples of such techniques include, but are not limited to, thermal, liquid-contact, electron beam and corona discharge techniques. In one particular embodiment, the electret treatment is a corona discharge technique, which involves subjecting the laminate to a pair of electrical fields that have opposite polarities. Other methods for forming an electret material are described in U.S. Pat. No. 4,215,682 to Kubik et al.; U.S. Pat. No. 4,375,718 to Wadsworth; U.S. Pat. No. 4,592,815 to Nakao; U.S. Pat. No. 4,874,659 to Ando; U.S. Pat. No. 5,401,446 to Tsai, et al.; U.S. Pat. No. 5,883,026 to Reader, et al.; U.S. Pat. No. 5,908,598 to Rousseau, et al.; U.S. Pat. No. 6,365,088 to Knight, et al., which are incorporated herein in their entirety by reference thereto for all purposes.

IV. Articles

The nonwoven web may be used in a wide variety of applications. For example, the web may be incorporated into a "medical product", such as gowns, surgical drapes, face-masks, head coverings, surgical caps, shoe coverings, sterilization wraps, warming blankets, heating pads, and so forth. Of course, the nonwoven web may also be used in various other articles. For example, the nonwoven web may be incorporated into an "absorbent article" that is capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, mitt wipe, and so forth; medical absorbent articles, such as garments, fenestration materials, underpads, bedpads, bandages, absorbent drapes, and medical wipes; food service wipers; clothing articles; pouches, and so forth. Materials and processes suitable for forming such articles are well known to those skilled in the art. Absorbent articles, for instance, typically include a substantially liquid-impermeable layer (e.g., outer cover), a liquid-permeable layer (e.g., bodyside liner, surge layer, etc.), and an absorbent core. In one embodiment, for example, a nonwoven web formed according to the present invention may be used to form an outer cover of an absorbent article. If desired, the nonwoven web may be laminated to a liquid-impermeable film that is either vapor-permeable or vapor-impermeable.

The present invention may be better understood with reference to the following examples. In each of the Examples below, polylactic acid was dried in a dessicant at a temperature of about 77° C. prior to blending with the polyepoxide modifier. The resulting blend was also dried in a dessicant dryer at a temperature of from 125° F. to 150° F. prior to fiber spinning.

EXAMPLE 1

Fibers formed from 100% polylactic acid (PLA) were formed as a control by extruding PLA 6201D (Natureworks®, melt flow rate of 10 g/10 min at 190° C.) into fiber form. More specifically, polylactic acid was supplied to an extruder heated to a temperature of 235° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn through a fiber draw unit and sent them onto a godet roll at a speed of 2000 meters per minute ("mpm"). The resulting draw ratio was 1549. Fibers were collected at 2000 mpm to provide a target 15 μm fiber. Fibers were then drawn onto a godet roll at a speed of 3000 meters per minute ("mpm"). The resulting draw ratio was 2324.

EXAMPLE 2

The ability to form fibers from a blend of 97 wt. % polylactic acid (PLA 6201D, Natureworks®) and 3 wt. % of a polyepoxide modifier was demonstrated. The polyepoxide modifier was poly(ethylene-co-methyl acrylate-co-glycidyl methacrylate) (Sigma-Aldrich Co.) having a melt flow rate of 6 g/10 min (190° C./2160 g), a glycidyl methacrylate content of 8 wt. %, methyl acrylate content of 25 wt. %, and ethylene content of 67 wt. %. The polymers were fed into a Thermo Prism™ USALAB 16 twin screw extruder (Thermo Electron Corp., Stone, England). The melt temperature of the extruder was 195° C. The extruder had 11 zones, numbered consecutively 0-10 from the feed hopper to the die. The polylactic acid resin was dry mixed with the polyepoxide modifier and fed to the feed throat of the extruder (un-heated, before zone 1 of the extruder) at a rate of 3 pounds per hour. The screw speed was 200 revolutions per minute ("rpm"). The die used to extrude the resin had 1 die openings (3 millimeters in diameter). Upon formation, the extruded resin was cooled on a fan-cooled conveyor belt and formed into pellets. The pellets were then supplied to an extruder heated to a temperature of 240° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 2000 meters per minute ("mpm"). The resulting draw ratio was 1549.

EXAMPLE 3

Fibers were formed from a blend of 95 wt. % polylactic acid (PLA 6201 D, Natureworks®) and 5 wt. % of poly(ethylene-co-methyl acrylate-co-glycidyl methacrylate) (Sigma-Aldrich Co.) as described in Example 2. The continuous fibers were then drawn onto a godet roll at a speed of 2000 meters per minute ("mpm"). The resulting draw ratio was 1549. Fibers were also spun at 3000 meters per minute ("mpm") for a resulting draw ratio of 2324.

EXAMPLE 4

Figure 2:
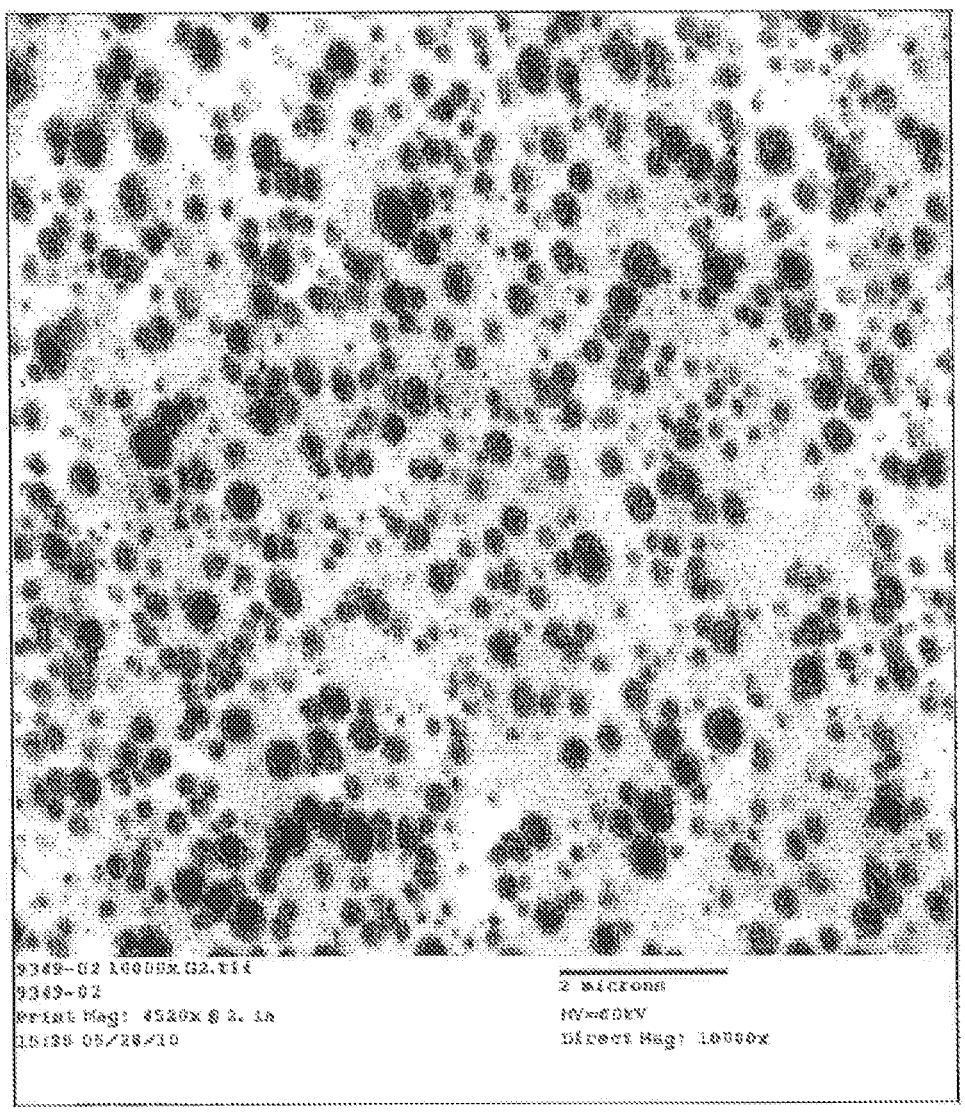
FIG. 2 is a TEM photograph (60 kV, 10,000×) of the polymer blend of Example 4, which contained 90 wt. % PLA 6201D (Natureworks®) and 10 wt. % poly(ethylene-co-methyl acrylate-co-glycidyl methacrylate)

Fibers were formed from a blend of 90 wt. % polylactic acid (PLA 6201D, Natureworks®) and 10 wt. % of poly(ethylene-co-methyl acrylate-co-glycidyl methacrylate) (Sigma-Aldrich Co.) as described in Example 2, except that the fibers were extruded at 215° C. and drawn onto a godet roll at 500 mpm with a resulting draw ratio of 387. Prior to formation of the fibers, transmission electron microscopy ("TEM") was also employed to view the blend. An image of the blend at 10,000× is shown in FIG. 2. As shown, the blend contains a plurality of small domains as evidenced by the darkened areas.

EXAMPLE 5

Pellets were formed from a blend of 85 wt. % polylactic acid (PLA 6201D, Natureworks®) and 15 wt. % of poly(ethylene-co-methyl acrylate-co-glycidyl methacrylate) (Sigma-Aldrich Co.) as described in Example 2. The resulting pellets were not fiber spun.

EXAMPLE 6

Fibers were formed from a blend of 90 wt. % polylactic acid (PLA 6201D, Natureworks®) and 10 wt. % of a polyepoxide modifier. The polyepoxide modifier was poly(ethylene-co-methyl acrylate-co-glycidyl methacrylate) (Lotader® AX8950, Arkema) having a melt flow rate of 70-100 g/10 min (190° C./2160 g), a glycidyl methacrylate content of 7 to 11 wt. %, methyl acrylate content of 13 to 17 wt. %, and ethylene content of 72 to 80 wt. %. The same process was employed as in Example 2, except that the fibers were extruded at 210° C. and drawn onto a godet roll at a speed of 800 mpm resulting in a draw ratio of 620.

EXAMPLE 7

Pellets were formed from a blend of 90 wt. % polylactic acid (PLA 6201D, Natureworks®) and 10 wt. % of poly(ethylene-co-methyl acrylate-co-glycidyl methacrylate) (Sigma-Aldrich Co.) as described in Example 2, except that the polymer were blended together at a melt temperature of 235° C. The resulting pellets were not fiber spun.

Ten (10) samples were made according to Examples 1-4 and 6 and then tested for tenacity and elongation. The results (average) are set forth below.

TABLE 1

Fiber Properties for Examples 1-4 and 6

| Example # | PLA (wt. %) | Epoxy-functional modifier | | Diameter (μm) | Elongation (%) | Tenacity (g/g) | Moisture Content Before Spinning (ppm) |
|---|---|---|---|---|---|---|---|
| | | Melt Flow Rate (g/10 min) | Wt. % | | | | |
| 1 | 100 | — | 0 | 10.31 | 43.01 | 4.17 | 40 |
| 2 | 97 | 6 | 3 | 14.84 | 123.40 | 2.19 | 73 |
| 3 | 95 | 6 | 5 | 14.89 | 147.13 | 1.74 | 59 |
| 4 | 90 | 6 | 10 | 25.54 | 32.07 | 1.60 | 47 |
| 6 | 90 | 70-100 | 10 | 21.09 | 41.93 | 1.93 | 53 |

EXAMPLE 8

The ability to form fibers from a blend of 88.7 wt. % polylactic acid (PLA 6201D, Natureworks®), 1.5 wt. % of a polyepoxide modifier, and 9.8 wt. % of a toughening additive was demonstrated. The polyepoxide modifier was poly(ethylene-co-methyl acrylate-co-glycidyl methacrylate) (Lotader® AX8950, Arkema). The toughening additive was Vistamaxx™ 2120 (Exxonmobil), which is a polyolefin copolymer/elastomer with a melt flow rate of 29 g/10 min (190° C., 2160 g) and a density of 0.866 g/cm³. The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). The pellets were then supplied to an extruder heated to a temperature of 220° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 1000 meters per minute ("mpm"). The resulting draw ratio was 775.

EXAMPLE 9

Fibers were formed as described in Example 8, except that the temperature at which the fibers were extruded was 240° C. and the draw speed of the godet roll was 1000 meters per minute ("mpm"). The resulting draw ratio was 775.

EXAMPLE 10

Fibers were formed as described in Example 8, except that the toughening additive was Escorene™ Ultra 7720 (Exxonmobil), which is an ethylene vinyl acetate ("EVA") resin, which has a melt flow rate of 150 g/10 min and a density of 0.946 g/cm$^3$ and the draw speed of the godet roll was 700 meters per minute ("mpm"). The resulting draw ratio was 542.

EXAMPLE 11

Fibers were formed as described in Example 10, except that the temperature at which the fibers were extruded was 240° C. and the draw speed of the godet roll was 1000 meters per minute ("mpm"). The resulting draw ratio was 775.

EXAMPLE 12

Fibers were formed as described in Example 10, except that the temperature at which the fibers were extruded was 230° C.

EXAMPLE 13

Fibers were formed as described in Example 8, except that the temperature at which the polymers were blended was 235° C. and the temperature at which the fibers were extruded was 235° C. and the draw speed of the godet roll was 3000 meters per minute ("mpm"). The resulting draw ratio was 2324.

Ten (10) samples were made according to Examples 8-13 and then tested for tenacity and elongation. The results (average) are set forth below.

EXAMPLE 14

The ability to form fibers from a blend of 89.6 wt. % polylactic acid (PLA 6201D, Natureworks®), 0.5 wt. % of a polyepoxide modifier, and 9.9 wt. % of a toughening additive was demonstrated. The polyepoxide modifier was poly(ethylene-co-methyl acrylate-co-glycidyl methacrylate) (Lotader® AX8950, Arkema). The toughening additive was Vistamaxx™ 2120 (Exxonmobil). The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). The pellets were then supplied to an extruder heated to a temperature of 220° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 500 meters per minute ("mpm"). The resulting draw ratio was 387. Fibers could not be collected.

EXAMPLE 15

Fibers were formed as described in Example 14, except that the temperature at which the fibers were extruded was 225° C. and the speed of the godet roll was 750 mpm. Fibers could not be collected.

EXAMPLE 16

Fibers were formed as described in Example 14, except that the temperature at which the fibers were extruded was 230° C. and the speed of the godet roll was 1500 mpm. Fibers could not be collected.

EXAMPLE 17

Fibers were formed as described in Example 14, except that the temperature at which the fibers were extruded was 235° C. and the speed of the godet roll was 2000 mpm. Fibers were collected at 2000 mpm and fibers were spun up to 3000 mpm.

TABLE 2

Fiber Properties for Examples 8-13

| Example # | Toughening Additive | Blending Temp. (° C.) | Fiber Extrusion Temp. (° C.) | Diameter (μm) | Elongation % | Tenacity g/g | Moisture Content Before Spinning (ppm) |
|---|---|---|---|---|---|---|---|
| 8 | Vistamaxx™ 2120 | 185 | 220 | 17.21 | 60.91 | 1.92 | 195 |
| 9 | Vistamaxx™ 2120 | 185 | 240 | 20.59 | 119.80 | 2.03 | 195 |
| 10 | Escorene™ Ultra 7720 | 185 | 220 | 25.49 | 89.47 | 2.20 | 85 |
| 11 | Escorene™ Ultra 7720 | 185 | 240 | 17.25 | 65.93 | 2.00 | 85 |
| 12 | Escorene™ Ultra 7720 | 185 | 230 | 19.17 | 96.01 | 1.97 | 85 |
| 13 | Vistamaxx™ 2120 | 235 | 235 | 12.85 | 83.87 | 1.99 | 57 |

EXAMPLE 18

Fibers were formed as described in Example 14, except that the temperature at which the fibers were extruded was 240° C. and the speed of the godet roll was 2000 mpm. Fibers were collected at 2000 mpm and fibers were spun up to 3000 mpm.

EXAMPLE 19

Fibers were formed as described in Example 14, except that the temperature at which the fibers were extruded was 245° C. and the speed of the godet roll was 2000 mpm. Fibers were collected at 2000 mpm and fibers were spun up to 2800 mpm.

EXAMPLE 20

Fibers were formed as described in Example 14, except that the temperature at which the fibers were extruded was 250° C. and the speed of the godet roll was 2000 mpm. Fibers were collected at 2000 mpm and fibers were spun up to 2900 mpm.

Ten (10) samples were made according to Examples 17-20 and then tested for tenacity and elongation. The results (average) are set forth below.

TABLE 3

Fiber Properties for Examples 17-20

| Example # | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|
| 17 | 235° C. | 2000 | 15.0 | 60.6 | 1.8 | 2324 | 133 |
| 18 | 240° C. | 2000 | 14.7 | 94.0 | 2.3 | 2324 | 133 |
| 19 | 245° C. | 2000 | 14.6 | 95.6 | 2.2 | 2169 | 133 |
| 20 | 250° C. | 2000 | 15.2 | 101.2 | 1.7 | 2246 | 133 |

EXAMPLE 21

The ability to form fibers from a blend of 88.7 wt. % polylactic acid (PLA 6201 D, Natureworks®), 1.5 wt. % of a polyepoxide modifier, and 9.8 wt. % of a toughening additive was demonstrated. The polyepoxide modifier was poly(ethylene-co-methyl acrylate-co-glycidyl methacrylate) (Lotader® AX8950, Arkema). The toughening additive was Vistamaxx™ 2120 (Exxonmobil). The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). The pellets were then supplied to an extruder heated to a temperature of 220° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 500 meters per minute ("mpm"). The resulting draw ratio was 387. Fibers could not be collected.

EXAMPLE 22

Fibers were formed as described in Example 21, except that the temperature at which the fibers were extruded was 225° C. and the speed of the godet roll was 1200 mpm. Fibers could not be collected.

EXAMPLE 23

Fibers were formed as described in Example 21, except that the temperature at which the fibers were extruded was 230° C. and the speed of the godet roll was 2000 mpm. Fibers were collected at 2000 mpm and fibers were spun up to 2400 mpm.

EXAMPLE 24

Fibers were formed as described in Example 21, except that the temperature at which the fibers were extruded was 235° C. and the speed of the godet roll was 2000 mpm. Fibers were collected at 2000 mpm and fibers were spun up to 3000 mpm.

EXAMPLE 25

Fibers were formed as described in Example 21, except that the temperature at which the fibers were extruded was 240° C. and the speed of the godet roll was 2000 mpm. Fibers were collected at 2000 mpm and fibers were spun up to 3000 mpm.

EXAMPLE 26

Fibers were formed as described in Example 21, except that the temperature at which the fibers were extruded was 245° C. and the speed of the godet roll was 2000 mpm. Fibers were collected at 2000 mpm and fibers were spun up to 3000 mpm.

EXAMPLE 27

Fibers were formed as described in Example 21, except that the temperature at which the fibers were extruded was 250° C. and the speed of the godet roll was 2000 mpm. Fibers were collected at 2000 mpm and fibers were spun up to 2800 mpm.

Ten (10) samples were made according to Examples 23-27 and then tested for tenacity and elongation. The results (average) are set forth below.

TABLE 4

Fiber Properties for Examples 23-27

| Example # | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|
| 23 | 230° C. | 2000 | 14.7 | 48.5 | 1.7 | 1859 | 306 |
| 24 | 235° C. | 2000 | 15.0 | 64.2 | 1.6 | 2324 | 306 |
| 25 | 240° C. | 2000 | 15.0 | 103.1 | 1.9 | 2324 | 306 |
| 26 | 245° C. | 2000 | 14.7 | 105.2 | 1.9 | 2324 | 306 |
| 27 | 250° C. | 2000 | 14.7 | 101.3 | 1.6 | 2169 | 306 |

EXAMPLE 28

The ability to form fibers from a blend of 87.8 wt. % polylactic acid (PLA 6201 D, Natureworks®), 2.4 wt. % of a polyepoxide modifier, and 9.8 wt. % of a toughening additive was demonstrated. The polyepoxide modifier was poly(ethylene-co-methyl acrylate-co-glycidyl methacrylate) (Lotader® AX8950, Arkema). The toughening additive was Vistamaxx™ 2120 (Exxonmobil). The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). The pellets were then supplied to an extruder heated to a temperature of 220° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 1300 meters per minute ("mpm"). The resulting draw ratio was 387. Fibers could not be collected.

EXAMPLE 29

Fibers were formed as described in Example 28, except that the temperature at which the fibers were extruded was 225° C. and the speed of the godet roll was 1500 mpm. Fibers could not be collected.

EXAMPLE 30

Fibers were formed as described in Example 28, except that the temperature at which the fibers were extruded was 230° C. and the speed of the godet roll was 2000 mpm. Fibers were collected at 2000 mpm and fibers were spun up to 3000 mpm.

EXAMPLE 31

Fibers were formed as described in Example 28, except that the temperature at which the fibers were extruded was 235° and the speed of the godet roll was 2000 mpm. Fibers were collected at 2000 mpm and fibers were spun up to 2900 mpm.

EXAMPLE 32

Fibers were formed as described in Example 28, except that the temperature at which the fibers were extruded was 240° C. and the speed of the godet roll was 2000 mpm. Fibers were collected at 2000 mpm and fibers were spun up to 3000 mpm.

EXAMPLE 33

Fibers were formed as described in Example 28, except that the temperature at which the fibers were extruded was 245° C. and the speed of the godet roll was 2000 mpm. Fibers were collected at 2000 mpm and fibers were spun up to 3000 mpm.

EXAMPLE 34

Fibers were formed as described in Example 28, except that the temperature at which the fibers were extruded was 250° C. and the speed of the godet roll was 2000 mpm. Fibers were collected at 2000 mpm and fibers were spun up to 2800 mpm.

Ten (10) samples were made according to Examples 30-34 and then tested for tenacity and elongation. The results (average) are set forth below.

TABLE 5

Fiber Properties for Examples 30-34

| Example # | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|
| 30 | 230° C. | 2000 | 14.5 | 45.9 | 1.6 | 2324 | 297 |
| 31 | 235° C. | 2000 | 14.6 | 70.7 | 1.6 | 2246 | 297 |
| 32 | 240° C. | 2000 | 13.8 | 86.8 | 1.9 | 2324 | 297 |

TABLE 5-continued

Fiber Properties for Examples 30-34

| Example # | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|
| 33 | 245° C. | 2000 | 14.2 | 105.5 | 1.9 | 2324 | 297 |
| 34 | 250° C. | 2000 | 14.6 | 95.1 | 1.6 | 2169 | 297 |

EXAMPLE 35

The ability to form fibers from a blend of 88.7 wt. % polylactic acid (PLA 6201 D, Natureworks®), 1.5 wt. % of a polyepoxide modifier, and 9.8 wt. % of a toughening additive was demonstrated. The polyepoxide modifier was poly(ethylene-co-methyl acrylate-co-glycidyl methacrylate) (Lotader® AX8950, Arkema). The toughening additive was Vistamaxx™ 2120 (Exxonmobil). The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 200 revolutions per minute ("rpm"). The pellets were then supplied to an extruder heated to a temperature of 220° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 2000 meters per minute ("mpm"). The resulting draw ratio was 1547. Fibers were collected and then godet roll was increased to 3000 mpm.

EXAMPLE 36

Fibers were formed as described in Example 35, except that the temperature at which the fibers were extruded was 230° C. and the speed of the godet roll was 2000 mpm. Fibers were collected at 2000 mpm and fibers were spun up to 3000 mpm.

EXAMPLE 37

Fibers were formed as described in Example 35, except that the temperature at which the fibers were extruded was 235° C. and the speed of the godet roll was 2000 mpm. Fibers were collected at 2000 mpm and fibers were spun up to 3000 mpm.

EXAMPLE 38

Fibers were formed as described in Example 35, except that the temperature at which the fibers were extruded was 240° C. and the speed of the godet roll was 2000 mpm. Fibers were collected at 2000 mpm and fibers were spun up to 3000 mpm.

EXAMPLE 39

Fibers were formed as described in Example 35, except that the temperature at which the fibers were extruded was 245° C. and the speed of the godet roll was 2000 mpm.

EXAMPLE 40

Fibers were formed as described in Example 35, except that the temperature at which the fibers were extruded was 250° C. and the speed of the godet roll was 2000 mpm. Fibers were collected at 2000 mpm and fibers were spun up to 3000 mpm.

EXAMPLE 41

Fibers were formed as described in Example 35, except that the temperature at which the fibers were extruded was 255° and the speed of the godet roll was 2000 mpm. Fibers were collected at 2000 mpm and fibers were spun up to 3000 mpm.

Ten (10) samples were made according to Examples 35-41 and then tested for tenacity and elongation. The results (average) are set forth below.

TABLE 6

Fiber Properties for Examples 35-41

| Example # | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|
| 35 | 220° C. | 2000 | 13.85 | 59.14 | 1.48 | 2324 | 629 |
| 36 | 230° C. | 2000 | 14.02 | 81.77 | 1.50 | 2324 | 629 |
| 37 | 235° C. | 2000 | 14.45 | 93.85 | 1.62 | 2324 | 473 |

TABLE 6-continued

Fiber Properties for Examples 35-41

| Example # | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|
| 38 | 240° C. | 2000 | 14.75 | 121.63 | 1.79 | 2324 | 473 |
| 39 | 245° C. | 2000 | 14.60 | 125.88 | 1.94 | 2324 | 473 |
| 40 | 250° C. | 2000 | 14.53 | 127.68 | 1.85 | 2324 | 217 |
| 41 | 255° C. | 2000 | 14.70 | 123.97 | 1.79 | 2324 | 217 |

EXAMPLE 42

Fibers were from a blend of 88.7 wt. % polylactic acid (PLA 6201D, Natureworks®), 9.8 wt. % of a toughening additive, and 1.5 wt. % of a polyepoxide modifier was also employed. The polyepoxide modifier was poly(ethylene-co-methyl acrylate-co-glycidyl methacrylate) (Lotader® AX8950, Arkema). The toughening additive was PP 3155 (Exxonmobil), a polypropylene homopolymer. The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 100 revolutions per minute ("rpm"). The pellets were then supplied to an extruder heated to a temperature of 230° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 2000 meters per minute ("mpm"). Fibers were collected at 2000 mpm and fibers were spun up to 3000 mpm.

EXAMPLE 43

Fibers were formed as described in Example 42, except that the temperature at which the fibers were extruded was 235° C. and the speed of the godet roll was 2000 mpm. Fibers were collected at 2000 mpm and fibers were spun up to 3000 mpm.

EXAMPLE 44

Fibers were formed as described in Example 42, except that the temperature at which the fibers were extruded was 240° C. and the speed of the godet roll was 2000 mpm. Fibers were collected at 2000 mpm and fibers were spun up to 3000 mpm.

Ten (10) samples were made according to Examples 42-44 and then tested for tenacity and elongation. The results (average) are set forth below.

TABLE 7

Fiber Properties for Examples 42-44

| Example # | Epoxy-functional modifier (wt. %) | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|---|
| 42 | 1.5 | 230° C. | 2000 | 12.80 | 87.52 | 2.88 | 2324 | 630 |
| 43 | 1.5 | 235° C. | 2000 | 12.90 | 87.65 | 2.86 | 2324 | 630 |
| 44 | 1.5 | 240° C. | 2000 | 12.24 | 88.76 | 2.98 | 2324 | 630 |

EXAMPLE 45

The ability to form fibers from a blend of 89.25 wt. % polylactic acid (PLA 6201D, Natureworks®), 0.75 wt. % of a polyepoxide modifier, and 10 wt. % of a toughening additive was demonstrated. The polyepoxide modifier was poly(ethylene-co-methyl acrylate-co-glycidyl methacrylate) (Lotader® AX8900, Arkema). The toughening additive was PP 3155 (Exxon-Mobil), a polypropylene homopolymer. The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 200 revolutions per minute ("rpm"). Upon formation, the extruded resin was cooled on a fan-cooled conveyor belt and formed into pellets. The pellets were then supplied to an extruder heated to a temperature of 240° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 2000 meters per minute ("mpm"). The resulting draw ratio was 1547. Fibers were collected and then godet roll was increased to 3000 mpm. The extruder throughput was then decreased to 0.28 grams per hole per minute and fibers were drawn onto a godet roll at 3000 mpm resulting in a draw ratio of 3320.

(Clariant Corporation, 10% BASF Joncryl™ ADR 4368 let down in Natureworks PLA 6201D) and the concentration of CESA was 0.5 wt. % and the speed of the godet roll was 2000 mpm resulting in a draw ratio of 1549. Fibers were not collected.

Figure 4:
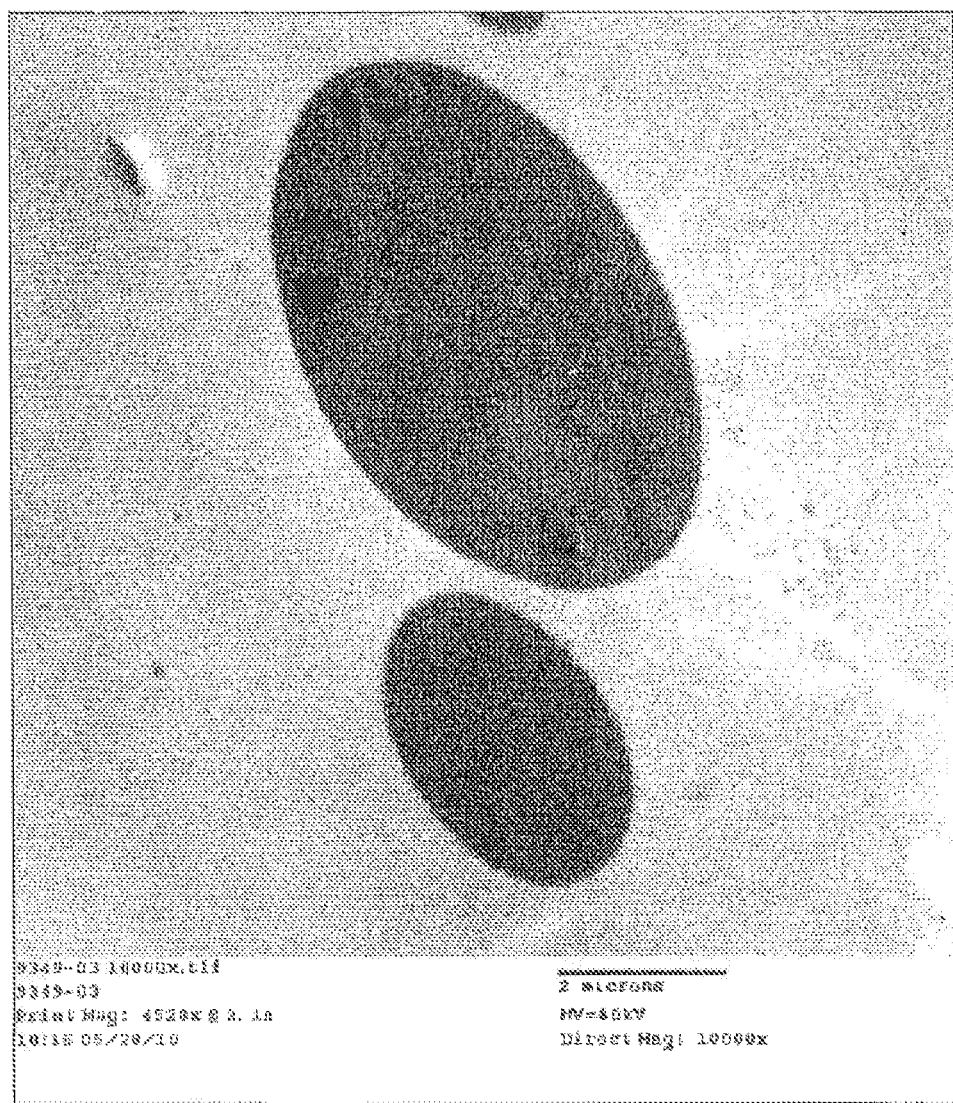
FIG. 4 is a TEM photograph (80 kV, 10,000×) of the polymer blend of Example 50, which contained 89.5 wt. % PLA 6201D (Natureworks®), 10 wt. % PP3155 (Exxonmobil), and 0.5 wt. % CESA™ Extend 8478 (Clariant Corporation)

Prior to formation of the fibers, transmission electron microscopy ("TEM") was also employed to view the blend. An image of the blend at 10,000× is shown in FIG. 4. As shown, the blend contains a plurality of large domains as evidenced by the darkened areas. Ten (10) fiber samples were also made according to Examples 45, 48, and 49 and then tested for tenacity and elongation. The results (average) are set forth below.

TABLE 8

Fiber Properties for Examples 45 and 48-49

| Example # | Epoxy-functional modifier (wt. %) | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|---|
| 45 | 0.75 | 240° C. | 2000 | 13.4 | 98.9 | 2.2 | 3320 | 83 |
| 48 | 0.50 | 240° C. | 2000 | 14.3 | 97.8 | 2.3 | 5810 | 43 |
| 49 | 0.75 | 240° C. | 2000 | 14.5 | 112.0 | 2.2 | 3873 | 332 |

EXAMPLE 46

Fibers were formed as described in Example 45, except that the temperature at which the fibers were extruded was 245° C. and the speed of the godet roll was 2000 mpm. Fibers were not collected.

EXAMPLE 47

Fibers were formed as described in Example 45, except that the temperature at which the fibers were extruded was 250° C. and the speed of the godet roll was 2000 mpm. Fibers were not collected.

EXAMPLE 48

Fibers were formed as described in Example 45, except that concentration of Lotader™ AX8900 was 0.5% and the speed of the godet roll was 2000 mpm. Fibers were collected at 2000 mpm and spun up to 3000 mpm at a throughput of 0.16 grams per hole per minute resulting in a draw ratio of 5810.

EXAMPLE 49

Figure 3:
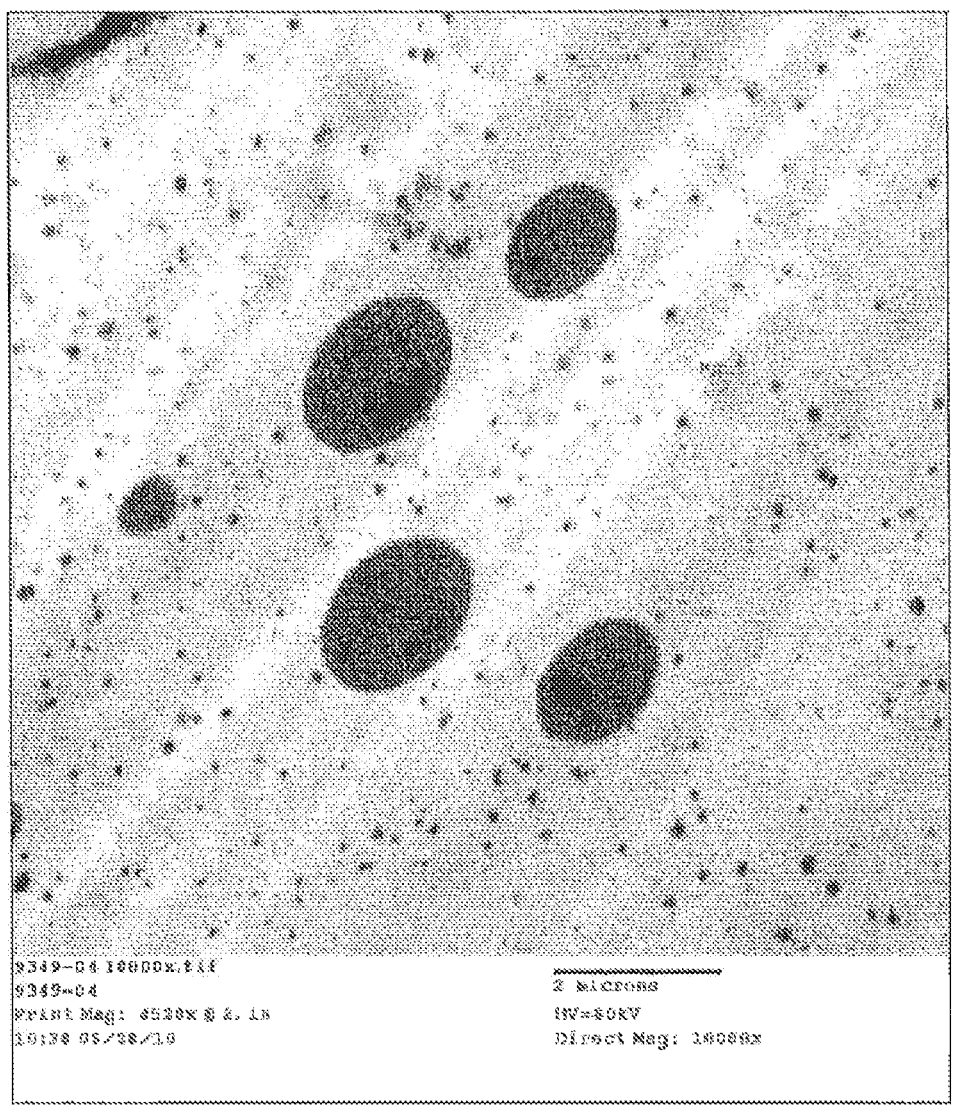
FIG. 3 is a TEM photograph (80 kV, 10,000×) of the polymer blend of Example 49, which contained 98.23 wt. % PLA 6201D (Natureworks®), 2.52 wt. % PP3155 (Exxonmobil), and 0.75 wt. % Lotader® AX8900 (Arkema)

Fibers were formed as described in Example 45, except that concentration of polypropylene was 2.5% and the speed of the godet roll was 2000 mpm. Fibers were collected at 2000 mpm and spun up to 3000 mpm at a throughput of 0.24 grams per hole per minute resulting in a draw ratio of 3873. Prior to formation of the fibers, transmission electron microscopy ("TEM") was also employed to view the blend. An image of the blend at 10,000× is shown in FIG. 3. As shown, the blend contains a plurality of nano-sized domains of Lotader® AX 8900 as evidenced by the smaller darkened areas and also a plurality of micro-sized domains of polypropylene as evidenced by the larger darkened areas.

EXAMPLE 50

Fibers were formed as described in Example 45, except that the polyepoxide modifier was CESA™ Extend 8478

EXAMPLE 51

The ability to form fibers from a blend of 98.5 wt. % polylactic acid (PLA 62010, Natureworks®), 1.5 wt. % of a polyepoxide modifier. The polyepoxide modifier was poly (ethylene-co-methyl acrylate-co-glycidyl methacrylate) (Lotader® AX8900, Arkema). The polymers were fed into a co-rotating, twin-screw extruder (ZSK-30, diameter of 30 mm, length of 1328 millimeters) was employed for compounding that was manufactured by Werner and Pfleiderer Corporation of Ramsey, N.J. The extruder possessed 14 zones, numbered consecutively 1-14 from the feed hopper to the die. The first barrel #1 received the resins via gravimetric feeder at a total throughput of 15 pounds per hour. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The screw speed was 200 revolutions per minute ("rpm"). Upon formation, the extruded resin was cooled on a fan-cooled conveyor belt and formed into pellets. The pellets were then supplied to an extruder heated to a temperature of 240° C. The throughput of the extruder was 0.4 grams per hole per minute (on a 16 hole per inch spinpack). The melt was extruded through the spinpack to form continuous fibers which were then quenched using forced air supplied by a blower a temperature of 25° C. The continuous fibers were then drawn onto a godet roll at a speed of 2000 meters per minute ("mpm"). The resulting draw ratio was 1547. Fibers were not collected but the godet roll was increased to 3000 mpm. The extruder throughput was then decreased to 0.28 grams per hole per minute and fibers were drawn onto a godet roll at 3000 mpm resulting in a draw ratio of 3320.

Figure 5:
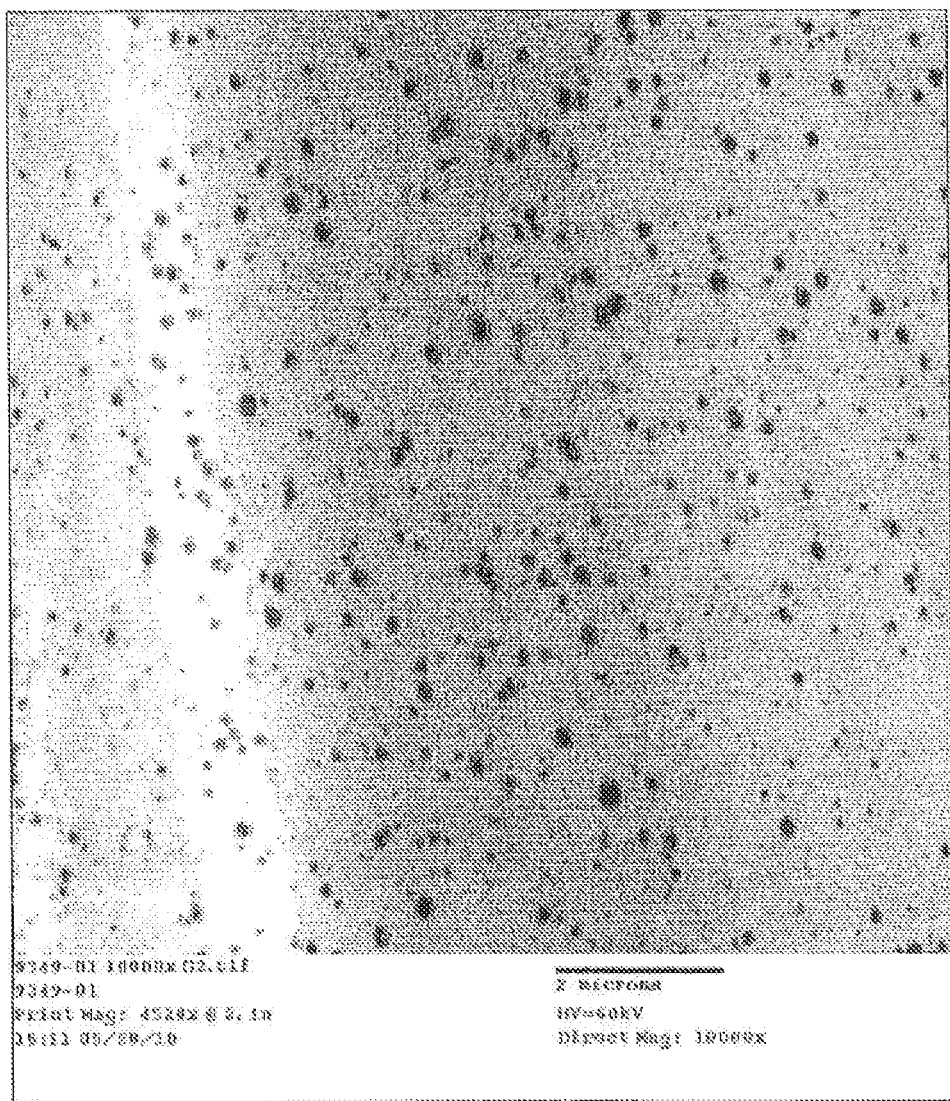
FIG. 5 is a TEM photograph (60 kV, 10,000×) of the polymer blend of Example 51, which contained 98.5 wt. % PLA 6201D (Natureworks®) and 1.5 wt. % Lotader® AX8900 (Arkema).

Prior to formation of the fibers, transmission electron microscopy ("TEM") was also employed to view the blend. An image of the blend at 10,000× is shown in FIG. 5. As shown, the blend contains a plurality of nano-sized domains of Lotader® AX 8900 as evidenced by the smaller darkened areas.

EXAMPLE 52

Fibers were formed as described in Example 51, except that concentration of Lotader® AX8900 was 0.5% and the speed of the godet roll was 2000 mpm. Fibers were collected at 2000 mpm and spun up to 3000 mpm at a throughput of 0.16 grams per hole per minute resulting in a draw ratio of 5810. Ten (10) samples were made according to Example 52 and then tested for tenacity and elongation. The results (average) are set forth below.

TABLE 9

Fiber Properties for Examples 52

| Example # | Polyepoxide modifier (wt. %) | Fiber Extrusion Temp. (° C.) | Godet Roll Speed (mpm) | Diameter (μm) | Elongation (%) | Tenacity g/g | Max Draw Down Ratio | Moisture Content Before Spinning (ppm) |
|---|---|---|---|---|---|---|---|---|
| 52 | 0.5 | 240° C. | 2000 | 13.6 | 69.4 | 2.8 | 5810 | 72 |

EXAMPLE 53

The ability to form spunbond webs from fibers made from a blend of 88.7 wt. % polylactic acid (PLA 6201D, Natureworks®), 9.8 wt. % PP3155 (Exxon-Mobil) and 1.5 wt. % of a polyepoxide modifier. The polyepoxide modifier was poly(ethylene-co-methyl acrylate-co-glycidyl methacrylate) (Lotader® AX8950, Arkema). The polymers were fed into a co-rotating, intermeshing, twin-screw extruder (64 mm, 2240 mm in length). The extruder possessed 8 zones, numbered consecutively 1-8 from the feed hopper to the die. The first barrel #1 received the resins via gravimetric feeder at a total throughput of 550 pounds per hour. The die used to extrude the resin had 24 die openings (3 millimeters in diameter). Upon formation, the extruded resin was underwater cooled and pelletized using a Gala Underwater pelletizer. The screw speed was 350 revolutions per minute ("rpm"). The pellets were then supplied to an extruder heated to a temperature of 240° C. The throughput of the extruder was 0.7 grams per hole per minute (0.6 mm opening, on a 100 hole per inch spinpack). The melt was extruded through the spinpack to form continuous fibers which were then quenched using forced air supplied by a blower a temperature of 25° C. The continuous fibers were then mechanically drawn using a fiber draw unit and deposited onto a moving forming wire at a draw speed of 4600 meters per minute resulting in a draw ratio of 2025. The fibers were then thermally bonded to form a continuous spunbond web using a heated calendar roll. The resulting web was collected on a winder and evaluated.

EXAMPLE 54

Spunbond webs were formed as described in Example 53, except that the polymer blend was a plasticized PLA consisting of 92 wt. % polylactic acid (PLA 6201D, Natureworks®), 2 wt. % Pluriol WI-285 (BASF), 2.7 wt. % Carbowax 8000 (Dow) and 3.3 wt. % Fusabond MD-353D (DuPont) and the draw speed was 3200 mpm resulting in a draw ratio of 1410. Resulting webs were collected on the winder for evaluation.

EXAMPLE 55

Spunbond webs were formed as described in Example 53, except that the polymer was 100 wt % Polylactic acid (PLA 6201D, Natureworks®), which was not blended and the draw speed was 3400 mpm (0.35 mm opening on 100 hole per inch pack) resulting in a draw ratio of 509. Resulting webs were collected on the winder for evaluation.

Ten (10) samples were made according to Examples 53-55 and then tested for tensile strength and elongation in both the machine (MD) and cross (CD) directions of the web. The results (average) are set forth below. Tensile strengths were normalized to basis weight to account for differences in basis weight.

TABLE 10

Fiber Properties for Examples 53-55

| Example # | Type of Blend | Basis weight (gsm) | Normalized MD tensile (g/(2"*gsm)) | Normalized CD tensile (g/(2"*gsm)) | MD Elongation (%) | CD Elongation (%) |
|---|---|---|---|---|---|---|
| 53 | PLA, PP3155, Lotader® AX8950 | 27.5 | 284 | 49 | 24 | 44 |
| 54 | Plasticized PLA | 22.0 | 132 | 32 | 18 | 52 |
| 55 | 100 wt. % PLA | 25.0 | 181 | 47 | 4 | 15 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A polylactic acid fiber having an average diameter of from about 5 to about 25 micrometers, the fiber comprising
   a thermoplastic composition formed by melt blending and reacting polylactic acid with a polyepoxide modifier including a copolymer that contains an epoxy modified (meth)acrylic monomeric component and an olefin monomeric component
   wherein the thermoplastic composition comprises 70 wt. % or more of the polylactic acid,
   and further comprises a polymeric toughening additive in an amount of from 1 wt. % to 25 wt. %,
   wherein the thermoplastic composition comprises a plurality of discrete domains dispersed within a continuous phase, at least some of the discrete domains containing the polyepoxide modifier, at least some of the discrete domains containing the polymeric toughening additive and having a length dimension of from about 0.5 µm to about 30 µm, and the continuous phase containing the polylactic acid, and wherein the fiber has a glass transition temperature of from about 55° C. to about 65° C., and exhibits a peak elongation of about 50% or more and a tenacity of from about 0.75 to about 6 grams-force per denier.

2. The polylactic acid fiber of claim 1, wherein the fiber exhibits a peak elongation of from about 100% to about 350%.

3. The polylactic acid fiber of claim 1, wherein the fiber exhibits a tenacity of from about 1.5 to about 3.5 grams-force per denier.

4. The polylactic acid fiber of claim 1, wherein the toughening additive is a polyolefin.

5. A nonwoven web comprising the fiber of claim 1.

6. An absorbent article comprising an absorbent core positioned between a liquid-permeable layer and a generally liquid-impermeable layer, the absorbent article comprising the nonwoven web of claim 5.

7. The polylactic acid fiber of claim 1, wherein the epoxy modified (meth)acrylic monomeric component is present in an amount of from 1 wt. % to 25 wt. % of the copolymer.

8. The polylactic acid fiber of claim 1, wherein melt blending the polylactic acid with the polyepoxide modifier comprises the polylactic acid and the polyepoxide modifier having been melt blended at a temperature above the melting point of the polylactic acid and below a temperature of about 230° C.

9. The polylactic acid fiber of claim 8, wherein reacting the polylactic acid with the polyepoxide modifier comprises the thermoplastic composition having been extruded a temperature above about 230° C. after the polylactic acid and the polyepoxide modifier have been melt blended.

10. The polylactic acid fiber of claim 1, wherein the olefin monomeric component comprises ethylene or propylene.

11. A method for forming a nonwoven web comprising the fiber of claim 1, the method comprising:

melt blending a polylactic acid, a polyepoxide modifier having a number average molecular weight of from about 7,500 to about 250,000 grams per mole and including a copolymer that contains an epoxy modified (meth)acrylic monomeric component and an olefin monomeric component, and a polymeric toughening additive to form a thermoplastic composition, wherein the melt blending occurs at a temperature above the melting point of the polylactic acid and below a temperature of about 230° C., wherein the amount of the polyepoxide modifier is from about 0.01 wt. % to about 10 wt. %, based on the weight of the polylactic acid, wherein the polylactic acid is present at 70 wt. % or more of the thermoplastic composition and wherein the polymeric toughening additive is present at from 1 wt. % to 25 wt. % of the thermoplastic composition;

thereafter, extruding the thermoplastic composition at a temperature above about 230° C. to facilitate reaction of the polyepoxide modifier with the polylactic acid;

passing the reacted composition through a die to form fibers; and randomly depositing the fibers onto a surface to form a nonwoven web;

wherein the thermoplastic composition comprises a plurality of discrete domains dispersed within a continuous phase, at least some of the discrete domains containing the polyepoxide modifier, at least some of the discrete domains containing the polymeric toughening additive and having a length dimension of from about 0.5 µm to about 30 µm, and the continuous phase containing the polylactic acid.

* * * * *